(12) United States Patent
Nakadai et al.

(10) Patent No.: US 9,664,772 B2
(45) Date of Patent: May 30, 2017

(54) SOUND PROCESSING DEVICE, SOUND PROCESSING METHOD, AND SOUND PROCESSING PROGRAM

(71) Applicant: HONDA MOTOR CO., LTD., Tokyo (JP)

(72) Inventors: Kazuhiro Nakadai, Wako (JP); Keisuke Nakamura, Wako (JP); Lana Sinapayen, Wako (JP); Michita Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 14/454,095

(22) Filed: Aug. 7, 2014

(65) Prior Publication Data

US 2015/0063069 A1 Mar. 5, 2015

(30) Foreign Application Priority Data

Aug. 30, 2013 (JP) ................................. 2013-180672

(51) Int. Cl.
*H04R 3/00* (2006.01)
*G01S 3/802* (2006.01)

(52) U.S. Cl.
CPC .................... *G01S 3/802* (2013.01)

(58) Field of Classification Search
CPC ..... G06F 3/04842; H04R 3/005; H04R 1/326; H04R 2430/21

(Continued)

(56) References Cited

U.S. PATENT DOCUMENTS 6,947,073 B1 * 9/2005 Seal ...................... G01S 3/7865
   348/143
2009/0100366 A1 * 4/2009 Fitzmaurice ........ G06F 3/04815
   715/767

(Continued)

FOREIGN PATENT DOCUMENTS

JP 2007-235334 A 9/2007
JP 2008-197650 A 8/2008

(Continued)

OTHER PUBLICATIONS

M.J.D. Powell, "The BOBYQA algorithm for bound constrained optimization without derivatives", Report DAMTP 2009/NA06, 2009.

(Continued)

*Primary Examiner* — Alexander Jamal
(74) *Attorney, Agent, or Firm* — Squire Patton Boggs (US) LLP

(57) ABSTRACT

A sound processing device includes a sound collection unit configured to record a sound signal, a tilt information acquisition unit configured to acquire tilt information on a tilt of the sound processing device, an azimuth estimation unit configured to estimate azimuths of a sound source in a plane in which the sound collection unit is arranged based on the sound signals which are recorded by the sound collection unit at least at two times; and an elevation angle estimation unit configured to estimate an elevation angle of the sound source with respect to the plane in which the sound collection unit is arranged based on the tilt information acquired by the tilt information acquisition unit and the azimuths estimated by the azimuth estimation unit at least at two times.

8 Claims, 18 Drawing Sheets

(58) Field of Classification Search
USPC .......................................... 381/92; 715/716
See application file for complete search history.

(56) References Cited

U.S. PATENT DOCUMENTS

| | | | | |
|---|---|---|---|---|
| 2013/0198630 A1* | 8/2013 | Lake, Jr. | .................... | G06F 3/01 715/716 |
| 2013/0275873 A1* | 10/2013 | Shaw | .................... | G01S 3/8006 715/716 |
| 2015/0063069 A1* | 3/2015 | Nakadai | .................. | G01S 3/802 367/118 |

FOREIGN PATENT DOCUMENTS

| | | |
|---|---|---|
| JP | 2009-296232 A | 12/2009 |
| JP | 2010-050571 A | 3/2010 |
| JP | 2010-072695 A | 4/2010 |
| JP | 2010-145524 A | 7/2010 |
| JP | 2010-278918 A | 12/2010 |
| JP | 2011-250100 A | 12/2011 |
| JP | 2012-042953 A | 3/2012 |
| JP | 2012-129873 A | 7/2012 |
| JP | 2013-008031 A | 1/2013 |
| JP | 2013-106298 A | 5/2013 |
| JP | 2014-510430 A | 4/2014 |
| WO | 2007/005108 A2 | 1/2007 |
| WO | 2007/099908 A1 | 9/2007 |
| WO | 2012/097314 A1 | 7/2012 |

OTHER PUBLICATIONS

Japan Patent Office, Notice of Allowance corresponding to Japanese Appln. No. 2013-180672, dated Oct. 4, 2016.

* cited by examiner

SOUND PROCESSING DEVICE, SOUND PROCESSING METHOD, AND SOUND PROCESSING PROGRAM

CROSS REFERENCE TO RELATED APPLICATIONS

Priority is claimed on Japanese Patent Application No. 2013-180672, filed on Aug. 30, 2013, the contents of which are entirely incorporated herein by reference.

BACKGROUND OF THE INVENTION

Field of the Invention

The present invention relates to a sound processing device, a sound processing method, and a sound processing program.

Description of Related Art

A system has been proposed which estimates a direction or a position of a sound source and notifies a user of the estimated sound source information (for example, see Japanese Unexamined Patent Application, First Publication No. 2008-197650 (Patent Document 1). In the technique described in Patent Document 1, sound data is recorded with eight microphones and sound source localization is performed on the recorded sound data based on a cross-correlation between a pair of microphones. In the technique described in Patent Document 1, seven normal microphones and one surround microphone are provided and the seven microphones are arranged on a base having a spherical shape.

When a sound source position is two-dimensionally estimated using an arrival time difference of sounds, for example, three or more microphones are necessary. These three or more microphones are arranged in the same plane. When a sound source position is three-dimensionally estimated using an arrival time difference of sounds, for example, four or more microphones are necessary. These four or more microphones are arranged so as not to be present in the same plane.

However, in the above-mentioned technique, since a plurality of microphones are three-dimensionally arranged, there is a problem in that a sound data acquisition unit or a sound source localization device increases in size.

SUMMARY OF THE INVENTION

The present invention is made in consideration of the above-mentioned circumstances and an object thereof is to provide a sound processing device, a sound processing method, and a sound processing program which can three-dimensionally estimate a sound source direction with a decreased size.

(1) In order to achieve the above-mentioned object, according to an aspect of the present invention, a sound processing device is provided including: a sound collection unit configured to record a sound signal; a tilt information acquisition unit configured to acquire tilt information on a tilt of the sound processing device; an azimuth estimation unit configured to estimate azimuths of a sound source in a plane in which the sound collection unit is arranged based on the sound signals which are recorded by the sound collection unit at least at two times; and an elevation angle estimation unit configured to estimate an elevation angle of the sound source with respect to the plane in which the sound collection unit is arranged based on the tilt information acquired by the tilt information acquisition unit and the azimuths estimated by the azimuth estimation unit at least at two times.

(2) As another aspect of the present invention, in the sound processing device according to (1), the elevation angle estimation unit may be configured to calculate a rotation matrix from a world coordinate system to a local coordinate system of the sound processing device based on the tilt information acquired by the tilt information acquisition unit, and to estimate the elevation angle of the sound source based on the calculated rotation matrix and the azimuths estimated by the azimuth estimation unit at least at two times.

(3) As another aspect of the present invention, in the sound processing device according to (1) or (2), the elevation angle estimation unit may be configured to smooth the elevation angles estimated at a plurality of times and determines the smoothed value as the elevation angle of the sound source.

(4) As another aspect of the present invention, the sound processing device according to any one of (1) to (3) may further include: a display unit configured to display an image; and an image processing unit configured to generate an image indicating the elevation angle estimated by the elevation angle estimation unit and to display the generated image on the display unit.

(5) As another aspect of the present invention, in the sound processing device according to (4), the image processing unit may be configured to generate an image indicating the azimuth estimated by the azimuth estimation unit and may display the generated image on the display unit.

(6) As another aspect of the present invention, the sound processing device according to (4) or (5) may further include an imaging unit configured to capture an image, and the image processing unit may be configured to synthesize at least the image indicating the elevation angle with the image captured by the imaging unit, and to display the synthesized image on the display unit.

(7) As another aspect of the present invention, in the sound processing device according to (6), the image processing unit may be configured to generate an image which varies at a speed based on the azimuth estimated by the azimuth estimation unit or the elevation angle estimated by the elevation angle estimation unit.

(8) As another aspect of the present invention, the sound processing device according to any one of (1) to (7) may further include: a sound reproduction unit configured to reproduce a sound signal; and an operation information acquisition unit configured to acquire selection information indicating a sound source selected by a user out of sound signals by sound sources, and the azimuth estimation unit may be configured to separate the sound signals recorded by the sound collection unit into the sound signals by sound sources, to estimate the azimuths of the sound sources based on the separated sound signals by sound sources, and to reproduce the sound signal corresponding to the selection information acquired by the operation information acquisition unit out of the separated sound signals from the sound reproduction unit.

(9) In order to achieve the above-mentioned object, according to another aspect of the present invention, a sound processing method using a sound processing device including a sound collection unit is provided including: a sound collecting step of recording a sound signal using the sound collection unit; a tilt information acquiring step of acquiring tilt information on a tilt of the sound processing device; an azimuth estimating step of estimating an azimuth of a sound source in a plane in which the sound collection unit is arranged based on the sound signals which are recorded in the sound collecting step at least at two times; and an elevation angle estimating step of estimating an elevation angle of the sound source with respect to the plane in which the sound collection unit is arranged based on the tilt information acquired in the tilt information acquiring step and the azimuth estimated in the azimuths estimating step at least at two times.

(10) In order to achieve the above-mentioned object, according to another aspect of the present invention, a non-transitory computer-readable storage medium is provided including a sound processing program causing a computer of a sound processing device including a sound collection unit to perform: a sound collecting step of recording a sound signal using the sound collection unit; a tilt information acquiring step of acquiring tilt information on a tilt of the sound processing device; an azimuth estimating step of estimating an azimuth of a sound source in a plane in which the sound collection unit is arranged based on the sound signals which are recorded in the sound collecting step at least at two times; and an elevation angle estimating step of estimating an elevation angle of the sound source with respect to the plane in which the sound collection unit is arranged based on the tilt information acquired in the tilt information acquiring step and the azimuths estimated in the azimuth estimating step at least at two times.

According to the aspect of (1), (9), or (10), it is possible to three-dimensionally estimate a sound source direction with a sound processing device having a decreased size.

According to the aspect of (2), it is possible to estimate an elevation angle of a sound source with a sound processing device having a decreased size.

According to the aspect of (3), it is possible to estimate an azimuth and an elevation angle so as to be more robust to disturbance, compared with a method of using sound signals and posture information at two times.

According to the aspect of (4) or (5), it is possible to display an azimuth estimated by the azimuth estimation unit and the elevation angle estimated by the elevation angle estimation unit as an image which can be easily intuitively recognized.

According to the aspect of (6), since the sound source direction is synthesized with the image captured by the imaging unit and the synthesized image is displayed on the display unit, a user can easily intuitively recognize the sound source direction.

According to the aspect of (7), a user can intuitively recognize the sound source direction with respect to the sound processing device through the use of the image displayed on the display unit. The user can recognize the sound source direction by moving the sound processing device based on the display.

According to the aspect of (8), it is possible to reproduce a sound signal of a desired sound source selected by the user.

DETAILED DESCRIPTION OF THE INVENTION

First, summaries of various embodiments of the present invention will be described below.

Sound processing devices according to various embodiments of the present invention record sound signals, for example, using microphones which are two-dimensionally arranged. Each sound processing device includes, for example, a geomagnetic sensor and an acceleration sensor, and acquires a rotation angle of the device detected by the geomagnetic sensor and the acceleration sensor. The sound processing device estimates a direction (azimuth and elevation angle) of a sound source for each frame. The frame is a time interval of a predetermined time or a sample length (frame length) or a signal included in the time interval. The frame length is, for example, 10 msec. The sound processing device is a portable terminal such as a mobile phone, a tablet terminal, and a portable game machine.

First Embodiment

Hereinafter, a first embodiment of the present invention will be described with reference to the accompanying drawings.

Figure 1:
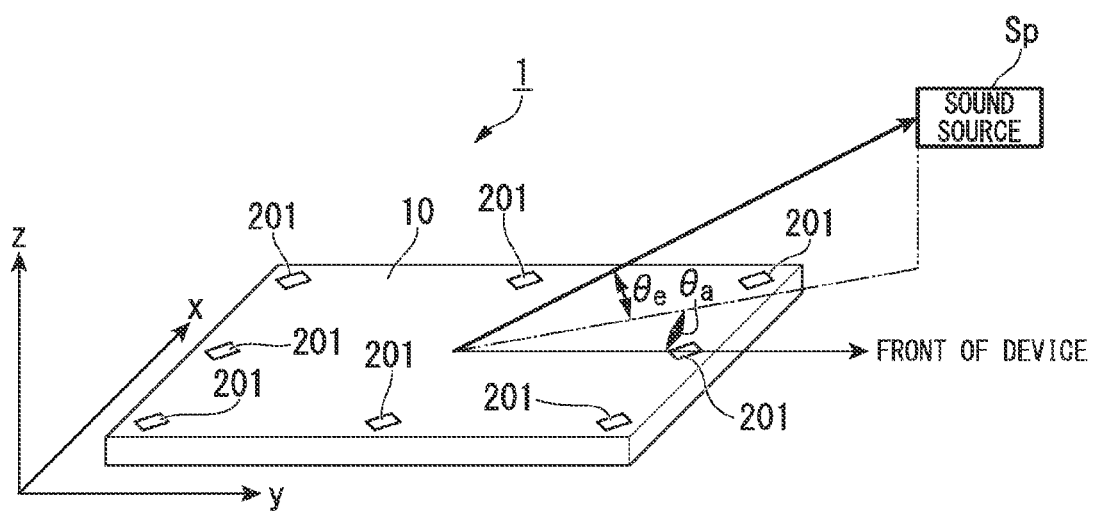
FIG. 1 is a diagram showing an arrangement example of a sound processing system according to a first embodiment of the present invention.

FIG. 1 is a diagram showing an arrangement example of a sound processing system 1 according to the first embodiment. As shown in FIG. 1, the sound processing system 1 includes a sound processing device 10 and eight microphones 201. As shown in FIG. 1, the eight microphones 201 are attached substantially in the surrounding part of the sound processing device 10. The number of and arrangement of the microphones 201 shown in FIG. 1 are an example and the number and arrangement of the microphones 201 are not limited to this example.

In this arrangement example, the short-length direction of the sound processing device 10 is defined as an x axis direction, the longitudinal direction is defined as a y axis direction, and the thickness direction is defined as the z axis direction. As shown in FIG. 1, the right side on the drawing surface in the y axis direction is defined as the front side of the sound processing device 10. The example shown in FIG. 1 is exemplary, and the front side of the sound processing device 10 may be defined as the upper side on the drawing surface in the y axis direction. The microphones 201 are arranged in the xy plane as the surface of the sound processing device 10 as shown in FIG. 1.

The angle $\theta_a$ in the xy plane represents an azimuth of a sound source Sp with respect to the front side of the sound processing device 10. The angle $\theta_c$ from the xy plane in the xyz space represents an elevation angle of the sound source Sp with respect to the front side of the sound processing device 10. The sound source Sp is, for example, a speaker or the like emitting a sound signal. The azimuth of the sound source means, for example, a direction in the horizontal plane (xy plane) with respect to the direction from the central point of the positions of the eight microphones 201 to a predetermined microphone 201 out of the eight microphones 201. The elevation angle of the sound source is a direction in the xyz space with respect to the xy plane in which the microphones 201 are arranged.

The configuration of the sound processing device 10 according to the first embodiment will be described below.

Figure 2:
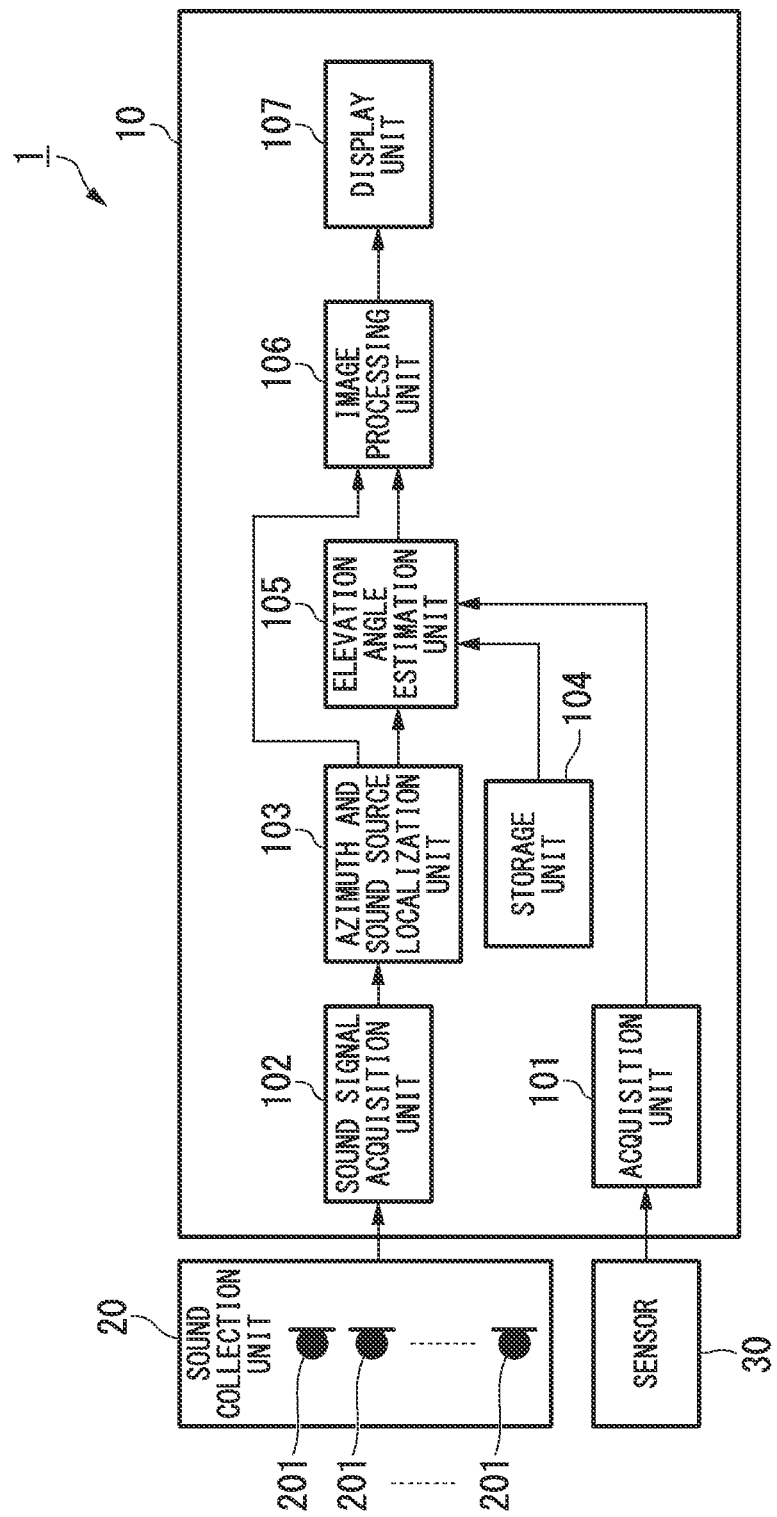
FIG. 2 is a block diagram showing a configuration of a sound processing device according to the first embodiment.

FIG. 2 is a block diagram showing the configuration of the sound processing device 10 according to the first embodiment. As shown in FIG. 2, the sound processing device 10 includes an acquisition unit 101, a sound signal acquisition unit 102, an azimuth and sound source localization unit (azimuth estimation unit) 103, a storage unit 104, an elevation angle estimation unit 105, an image processing unit 106, and a display unit 107. The sound processing device 10 is connected to a sound collection unit 20 and a sensor 30.

The sound collection unit 20 records sound signals of N channels (where N is an integer greater than 1, for example, 8) and transmits the recorded sound signals of N channels to the sound processing device 10. The sound collection unit 20 includes N microphones 201 that receive, for example, sound waves having components of frequency bands (for example, 200 Hz to 4 kHz). The N microphones 201 are arranged, for example, at the positions shown in FIG. 1. The sound collection unit 20 may transmit the recorded sound signals of N channels in a wireless manner or in a wired manner. When N is greater than 1, the sound signals of channels only have to be synchronized with each other at the time of transmission.

The sensor 30 detects a pitch around the x axis (see FIG. 1) of the sound processing device 10, a roll around the y axis, and an yaw around the z axis and outputs the detected pitch, roll, and yaw as rotation angle information to the sound processing device 10. The sensor 30 is, for example, a geomagnetic sensor and an acceleration sensor. Alternatively, the sensor 30 detects an angular velocity of the sound processing device 10 and outputs the detected angular velocity to the sound processing device 10. The sensor 30 detecting an angular velocity is, for example, three-axis gyro sensor. The pitch, roll, and yaw detected by the sensor 30 are values in the world coordinate system, not in the local coordinate system in the device shown in FIG. 1 (hereinafter, referred to as the device coordinate system). Tilt information in the present invention is rotation angle information or angular velocity information.

The acquisition unit (tilt information acquisition unit) 101 acquires the rotation angle information or the angular velocity information detected by the sensor 30 and outputs the acquired rotation angle information or the acquired angular velocity information to the elevation angle estimation unit 105.

The sound signal acquisition unit 102 acquires the N sound signals recorded by the N microphones 201 of the sound collection unit 20. The sound signal acquisition unit 102 generates an input signal of the frequency domain by performing Fourier transform on the acquired N sound signals for each frame in the time domain. The sound signal acquisition unit 102 outputs the Fourier-transformed N sound signals to the azimuth and sound source localization unit 103.

The azimuth and sound source localization unit 103 estimates the azimuth of the sound source Sp based on the input signal input from the sound signal acquisition unit 102 and outputs azimuth information indicating the estimated azimuth to the elevation angle estimation unit 105 and the image processing unit 106. The azimuth estimated by the azimuth and sound source localization unit 103 is a direction in the horizontal plane with respect to the direction from the central point of the positions of the N microphones 201 of the sound collection unit 20 to a predetermined microphone 201 out of the N microphones 201. For example, the azimuth and sound source localization unit 103 estimates the azimuth using a generalized singular value decomposition-multiple signal classification (GSVD-MUSIC) method.

Other sound source direction estimating methods such as a (weighted delay and sum beam forming (WDS-BF) method and a MUSIC may be used to estimate the azimuth.

The storage unit 104 stores an expression for estimating an elevation angle. The expression for estimating an elevation angle will be described later.

The elevation angle estimation unit 105 calculates rotation matrices Rx, Ry, and Rz of the axes using the rotation angle information at the f-th frame input from the acquisition unit 101 and calculates a rotation matrix R(f) for transforming an angle from the device coordinate system at the f-th frame to the world coordinate system by multiplied product of the calculated rotation matrices Rx, Ry, and Rz of the axes. The elevation angle estimation unit 105 calculates a rotation matrix $R^T(f+1)$ for transforming an angle from the world coordinate system at the (f+1)-th frame to the device coordinate system using the rotation angle information at the f-th frame input from the acquisition unit 101.

Alternatively, the elevation angle estimation unit 105 calculates a rotation matrix R(f) as a coordinate transform coefficient at the f-th frame and a rotation matrix $R^T(f+1)$ at the (f+1)-th frame using the angular velocity input from the acquisition unit 101 and, for example, using a Rodrigues's rotation formula.

The elevation angle estimation unit 105 calculates elements of a matrix $R^T(f+1)R(f)$ using the calculated rotation matrix R(f) and the calculated rotation matrix $R^T(f+1)$.

The elevation angle estimation unit 105 estimates an elevation angle using the azimuth $\theta_D(f)$ at the f-th frame and the azimuth $\theta_D(f+1)$ at the (f+1)-th frame input from the azimuth and sound source localization unit 103, the expression for estimating an elevation angle, which is stored in the storage unit 104, and the elements of the calculated matrix $R^T(f+1)R(f)$. The elevation angle estimation unit 105 outputs the elevation angle information indicating the estimated elevation angle to the image processing unit 106.

The image processing unit 106 displays the azimuth information input from the azimuth and sound source localization unit 103 and the elevation angle information input from the elevation angle estimation unit 105 on the display unit 107.

The display unit 107 displays the azimuth information and the elevation angle information through the use of the image processing unit 106. The display unit 107 is constituted, for example by a liquid crystal display panel or an organic electroluminescence (EL) display panel.

Figure 3:
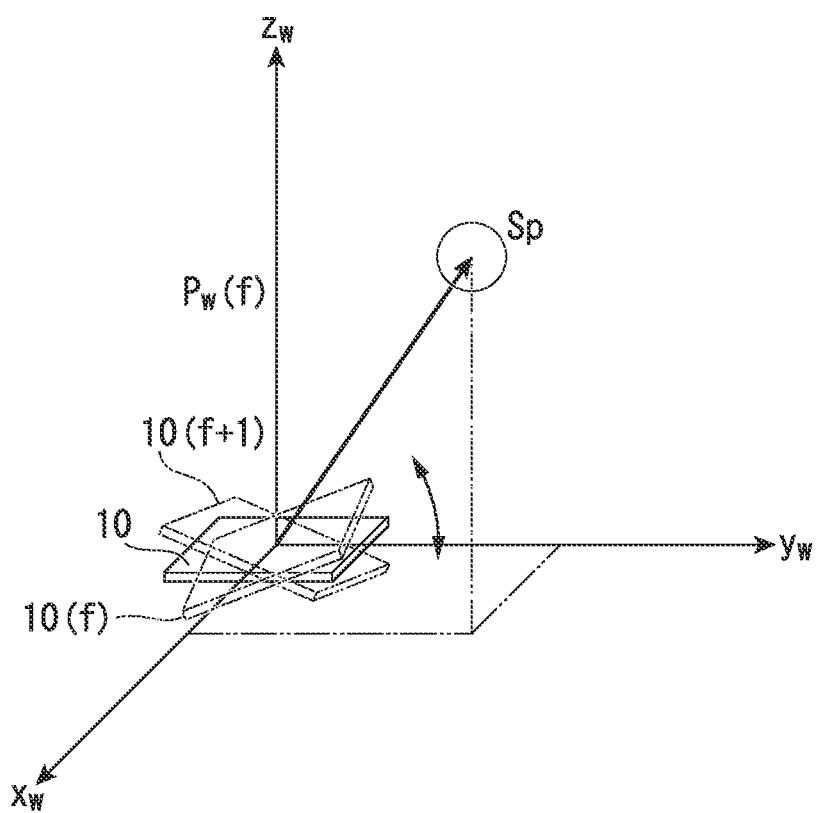
FIG. 3 is a diagram showing a world coordinate system according to the first embodiment.

The world coordinate system and the device coordinate system will be described below. FIG. 3 is a diagram showing the world coordinate system according to the first embodiment.

The world coordinate system is a coordinate system for defining a three-dimensional world as a whole and is expressed by $x_w$, $y_w$, and $z_w$ as shown in FIG. 3. A vector indicated by reference sign $P_W(f)$ is a position vector of a sound source (hereinafter, referred to as sound source position vector) in the world coordinate system. Subscript W represents the world coordinate system and f represents a frame. A sound processing device 10(f) in FIG. 3 represents the sound processing device 10 at the f-th frame and a sound processing device 10(f+1) represents the sound processing device 10 at the (f+1)-th frame.

As shown in FIG. 3, when the center of the sound processing device 10 is located at the origin, the position, the azimuth, and the elevation angle of the sound source Sp in the world coordinate system are not changed even by tilting the sound processing device 10 in any direction of the $x_w$ axis direction, the $y_w$ axis direction, and the $z_w$ axis direction. For example, by causing a user to tilt or move the sound processing device 10, the tilted state of the device at the f-th frame and the (f+1)-th frame shown in FIG. 3 appears.

Figure 4:
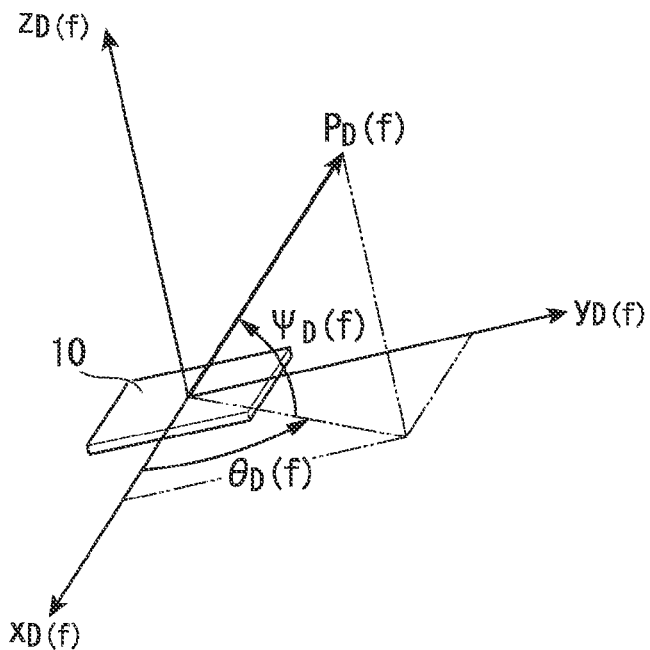
FIG. 4 is a diagram showing a device coordinate system at the f-th frame in the first embodiment.

FIG. 4 is a diagram showing the device coordinate system at the f-th frame according to the first embodiment.

Figure 5:
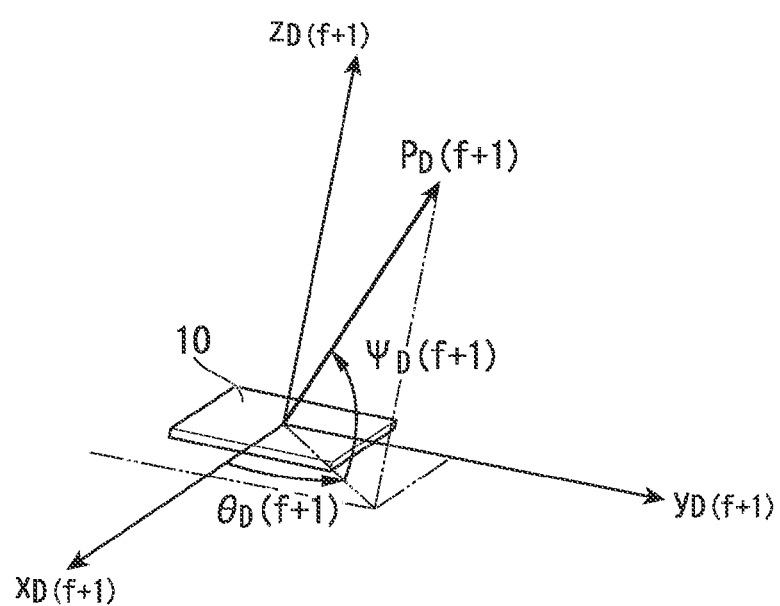
FIG. 5 is a diagram showing a device coordinate system at the (f+1)-th frame in the first embodiment.

FIG. 5 is a diagram showing the device coordinate system at the (f+1)-th frame according to the first embodiment. The device coordinate system is a coordinate system based on the viewpoint of the sound processing device 10 and is, for example, a coordinate system in which the center of the sound processing device 10 is defined as the origin, the top surface of the sound processing device 10 is defined as the xy plane, and the thickness direction of the sound processing device 10 is defined as the z axis direction.

As shown in FIGS. 4 and 5, the device coordinate system is expressed by $x_D$, $y_D$, and $z_D$.

Subscript D represents the device coordinate system. The positions of the sound sources Sp in the world coordinate system in FIGS. 4 and 5 are the same position.

As shown in FIG. 4, the sound source position vector $P_D(f)$ of the sound source Sp at the f-th frame has an azimuth $\theta_D(f)$ with respect to an axis $x_D(f)$ and an elevation angle $\phi_D(f)$ with respect to a plane $x_{D(f)}y_{D(f)}$. As shown in FIG. 5, the sound source position vector $P_D(f+1)$ of the sound source Sp at the (f+1)-th frame has an azimuth $\theta_D(f+1)$ with respect to an axis $x_D(f+1)$ and an elevation angle $\phi_D(f+1)$ with respect to a plane $x_{D(f+1)}y_{D(f+1)}$.

In this manner, when the sound processing device 10 is tilted or moved in any direction of the $x_w$ axis direction, the $y_w$ axis direction, and the $z_w$ axis direction, the position, the azimuth, and the elevation angle of the sound source Sp based on the viewpoint of the device coordinate system vary as shown in FIGS. 4 and 5.

Figure 6:
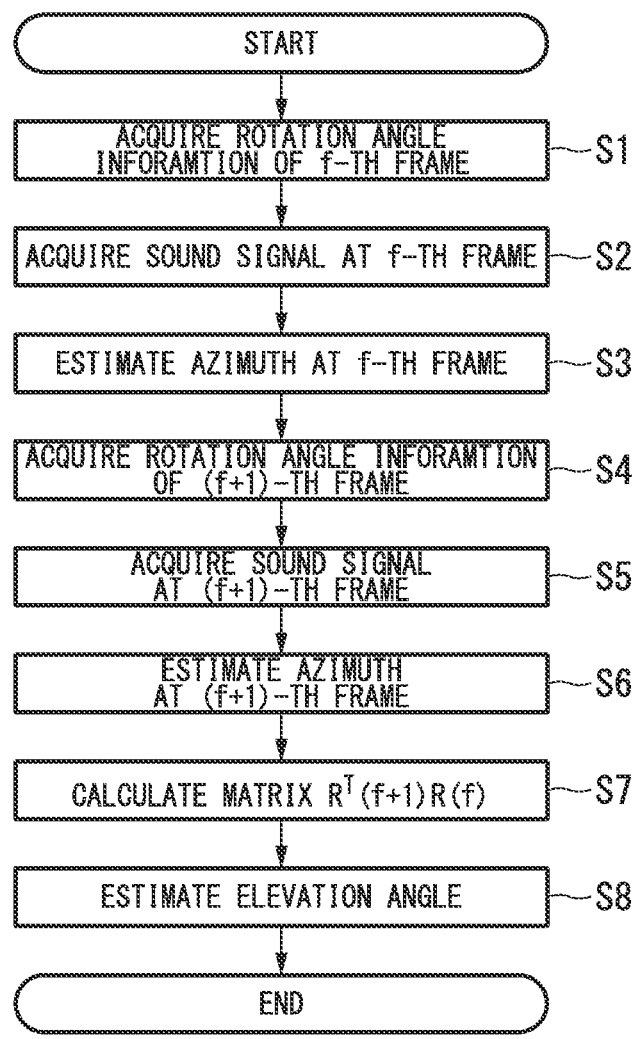
FIG. 6 is a flowchart showing a process flow of the sound processing device according to the first embodiment.

The process flow in the sound processing device 10 will be described below. FIG. 6 is a flowchart showing the flow process in the sound processing device 10 according to the first embodiment. In the following example, the acquisition unit 101 acquires the rotation angle information.

(Step S1) The acquisition unit 101 acquires the rotation angle information detected by the sensor 30 at the f-th frame and outputs the acquired rotation angle information to the elevation angle estimation unit 105. After the process of step S1 ends, the acquisition unit 101 transfers the process flow to step S2.

(Step S2) The sound signal acquisition unit 102 acquires the sound signals of N channels recorded by the sound collection unit 20 at the f-th frame. After the process of step S2 ends, the sound signal acquisition unit 102 transfers the process flow to step S3.

(Step S3) The azimuth and sound source localization unit 103 estimates the azimuth $\theta_D(f)$ at the f-th frame based on the input signal output from the sound signal acquisition unit 102 and outputs the estimated azimuth $\theta_D(f)$ to the elevation angle estimation unit 105. After the process of step S3 ends, the azimuth and sound source localization unit 103 transfers the process flow to step S4.

(Step S4) The acquisition unit 101 acquires the rotation angle information detected by the sensor 30 at the (f+1)-th frame and outputs the acquired rotation angle information to the elevation angle estimation unit 105. After the process of step S4 ends, the acquisition unit 101 transfers the process flow to step S5.

(Step S5) The sound signal acquisition unit 102 acquires the sound signals of N channels recorded by the sound collection unit 20 at the (f+1)-th frame. After the process of step S5 ends, the sound signal acquisition unit 102 transfers the process flow to step S6.

(Step S6) The azimuth and sound source localization unit 103 estimates the azimuth $\theta_D(f+1)$ at the (f+1)-th frame based on the input signal output from the sound signal acquisition unit 102 and outputs the estimated azimuth $\theta_D(f+1)$ to the elevation angle estimation unit 105. After the process of step S6 ends, the azimuth and sound source localization unit 103 transfers the process flow to step S7.

(Step S7) The elevation angle estimation unit 105 calculates a rotation matrix R(f) at the f-th frame using the rotation angle information at the f-th frame. Then, the elevation angle estimation unit 105 calculates a rotation matrix $R^T(f+1)$ at the (f+1)-th frame using the rotation angle information at the (f+1)-th frame.

Then, the elevation angle estimation unit 105 calculates a matrix $R^T(f+1)R(f)$ which is a multiplied product of the calculated rotation matrix $R^T(f+1)$ and the calculated rotation matrix R(f). After the process of step S7 ends, the elevation angle estimation unit 105 transfers the process flow to step S8.

(Step S8) The elevation angle estimation unit 105 estimates the elevation angle $\phi_D(f)$ at the f-th frame using the azimuth $\theta_D(f)$ at the f-th frame, the azimuth $\theta_D(f+1)$ at the (f+1)-th frame, the calculated matrix $R^T(f+1)R(f)$, and the elevation angle estimating expression stored in the storage unit 104.

Then, the image processing unit 106 displays the azimuth information input from the azimuth and sound source localization unit 103 and the elevation angle information input from the elevation angle estimation unit 105 on the display unit 107.

In this manner, the process of estimating an elevation angle ends.

Estimation of an elevation angle $\phi_D(f)$ will be described below.

As shown in FIG. 4, the sound source position vector $P_D(f)$ in the device coordinate system at the f-th frame is expressed by Expression (1).

$$P_D(f) = \begin{bmatrix} \cos(\psi_D(f))\cos(\theta_D(f)) \\ \cos(\psi_D(f))\sin(\theta_D(f)) \\ \sin(\psi_D(f)) \end{bmatrix} \quad (1)$$

In Expression (1), the azimuth $\theta_D(f)$ is a value estimated by the azimuth and sound source localization unit 103. The elevation angle $\phi_D(f)$ is a value estimated by the elevation angle estimation unit 105.

When the rotation matrix from the world coordinate system to the device coordinate system is defined as $R(f)$, the sound source position vector $P_W(f)$ in the world coordinate system in FIG. 3 is expressed by Expression (2).

$$P_W(f) = R(f)P_D(f) \quad (2)$$

The rotation matrices about the x axis, the y axis, and the z axis based on the rotation angle information (the rotation angle $\theta_P$ about the x axis, the rotation angle $\theta_R$ about the y axis, and the rotation angle $\theta_A$ about the x axis) acquired by the acquisition unit 101 are expressed, for example, by Expressions (3) to (5), respectively. The rotation matrix $R(f)$ can be calculated by the multiplied product of Expressions (3) to (5).

$$R_x(\theta_P) = \begin{bmatrix} 1 & 0 & 0 \\ 0 & \cos\theta_P & -\sin\theta_P \\ 0 & \sin\theta_P & \cos\theta_P \end{bmatrix} \quad (3)$$

$$R_y(\theta_R) = \begin{bmatrix} \cos\theta_R & 0 & \sin\theta_R \\ 0 & 1 & 1 \\ -\sin\theta_R & 0 & \cos\theta_R \end{bmatrix} \quad (4)$$

$$R_z(\theta_A) = \begin{bmatrix} \cos\theta_A & -\sin\theta_A & 0 \\ \sin\theta_A & \cos\theta_A & 0 \\ 0 & 0 & 1 \end{bmatrix} \quad (5)$$

When the position of the sound source Sp is substantially constant at the f-th frame and at the (f+1)-th frame, the sound source position vector $P_D(f)$ in the device coordinate system at the (f+1)-th frame is expressed by Expressions (2) to (6).

$$\begin{aligned} P_D(f+1) &= \begin{bmatrix} P_{Dx}(f+1) \\ P_{Dy}(f+1) \\ P_{Dz}(f+1) \end{bmatrix} \\ &= R^T(f+1)P_w(f) \\ &= R^T(f+1)R(f)P_D(f) \end{aligned} \quad (6)$$

In Expression (6), the elements of $R^T(f+1)R(f)$ are expressed by $r_{11}$ to $r_{33}$ as in Expression (7).

$$R^T(f+1)R(f) = \begin{bmatrix} r_{11} & r_{12} & r_{13} \\ r_{21} & r_{22} & r_{23} \\ r_{31} & r_{32} & r_{33} \end{bmatrix} \quad (7)$$

Expression (7) is calculated by the elevation angle estimation unit 105 based on the rotation matrix $R(f)$ calculated using the rotation angle information at the f-th frame input from the acquisition unit 101 and the rotation matrix $R(f+1)$ calculated using the rotation angle information at the (f+1)-th frame.

The sound source position vector $P_{Dx}(f+1)$ of the axis $x_{D(f+1)}$ in the device coordinate system at the (f+1)-th frame is expressed by Expression (8) using Expressions (1) and (7).

$$\begin{aligned} P_{Dx}(f+1) &= [\,r_{11} \quad r_{12} \quad r_{13}\,]P_D(f) \\ &= r_{11}\cos(\psi_D(f))\cos(\theta_D(f)) + \\ &\quad r_{12}\cos(\psi_D(f))\sin(\theta_D(f)) + \\ &\quad r_{13}\sin(\psi_D(f)) \end{aligned} \quad (8)$$

Similarly, the sound source position vector $P_{Dy}(f+1)$ of the axis $y_{D(f+1)}$ in the device coordinate system at the (f+1)-th frame is expressed by Expression (9) using Expressions (1) and (7).

$$\begin{aligned} P_{Dy}(f+1) &= [\,r_{21} \quad r_{22} \quad r_{23}\,]P_D(f) \\ &= r_{21}\cos(\psi_D(f))\cos(\theta_D(f)) + \\ &\quad r_{22}\cos(\psi_D(f))\sin(\theta_D(f)) + \\ &\quad r_{33}\sin(\psi_D(f)) \end{aligned} \quad (9)$$

The tangent of $\theta_D(f+1)$ is calculated by Expression (10) using Expressions (8) and (9).

$$\tan(\theta_D(f+1)) = \frac{P_{Dy}(f+1)}{P_{Dx}(f+1)} = \frac{r_{21}\cos(\psi_D(f))\cos(\theta_D(f)) + r_{22}\cos(\psi_D(f))\sin(\theta_D(f)) + r_{23}\sin(\psi_D(f))}{r_{11}\cos(\psi_D(f))\cos(\theta_D(f)) + r_{12}\cos(\psi_D(f))\sin(\theta_D(f)) + r_{13}\sin(\psi_D(f))} \quad (10)$$

Then, by transforming Expression (10) using an expression of $\sin(\phi_D(f))$ and dividing the transformed expression by $\cos(\phi_D(f))$, the tangent of $(\phi_D(f)$ is calculated by Expression (11).

$$\tan(\psi_D(f)) = \frac{\sin(\psi_D(f))}{\cos(\psi_D(f))} = \frac{r_{11}\cos(\theta_D(f))\tan(\theta_D(f+1)) + r_{12}\sin(\theta_D(f))\tan(\theta_D(f+1)) - r_{21}\cos(\theta_D(f)) - r_{22}\sin(\theta_D(f))}{r_{23} - r_{13}\tan(\theta_D(f+1))} \quad (11)$$

The elevation angle estimation unit 105 estimates the elevation angle by substituting the azimuth $\theta_D(f)$ at the f-th frame and the azimuth $\theta_D(f+1)$ at the (f+1)-th frame input from the azimuth and sound source localization unit 103 for Expression (11) and calculating the elevation angle $\phi_D(t)$.

As described above, the sound processing device 10 according to the first embodiment includes the sound collection unit 20 configured to record a sound signal, the tilt information acquisition unit (the acquisition unit 101) configured to acquire tilt information (the rotation angle and the angular velocity) on a tilt of the device, the azimuth estimation unit (the azimuth and sound source localization unit 103) configured to estimate an azimuth of a sound source in a plane in which the sound collection unit is arranged based on the sound signals which are recorded by the sound collection unit at least at two times (frames), and the elevation angle estimation unit 105 configured to estimate an elevation angle of the sound source with respect to the plane in which the sound collection unit is arranged based on the tilt information acquired by the tilt information acquisition unit and the azimuths estimated by the azimuth estimation unit at least at two times (frames).

According to this configuration, the sound processing device 10 according to the first embodiment can estimate the azimuth and the elevation angle of the sound source Sp based on the sound signals at two frames recorded by the microphones 201 and the rotation angle information or the angular velocity detected by the sensor 30, by causing a user to tilt or move the sound processing device 10. As a result, even when the sound processing device 10 according to the first embodiment is applied to a terminal such as a mobile terminal in which it is difficult to three-dimensionally arrange the microphones 201, it is possible to estimate the azimuth and the elevation angle of a sound source Sp by the use of the microphones 201 which are two-dimensionally arranged.

The first embodiment describes the configuration example where the microphones 201 are two-dimensionally arranged on the top surface of the sound processing device 10 as shown in FIG. 1; however, the present invention is not limited to this configuration.

Figure 7:
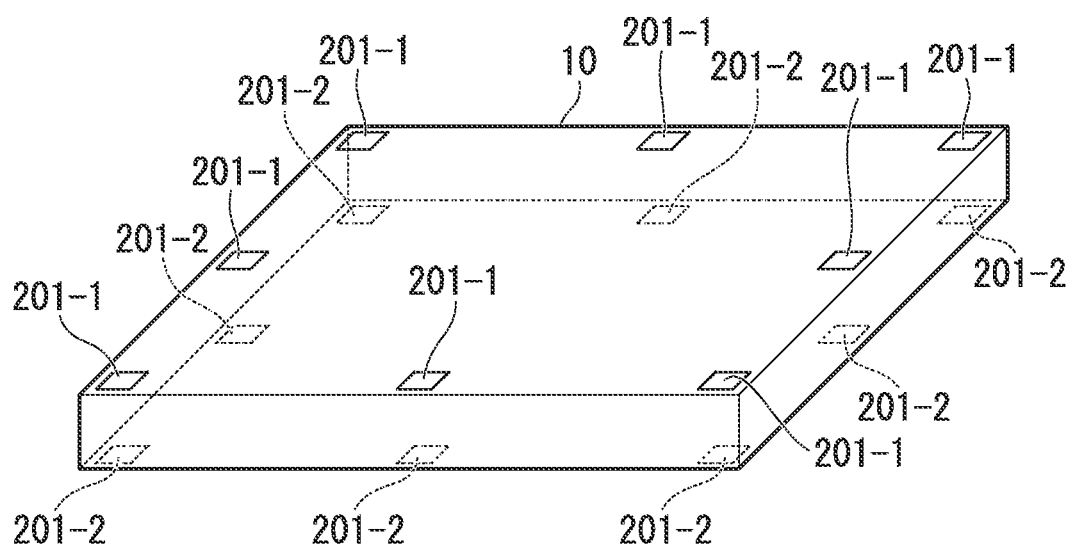
FIG. 7 is a diagram showing another arrangement example of microphones according to the first embodiment.

FIG. 7 is a diagram showing another arrangement example of the microphones 201 in the first embodiment. As shown in FIG. 7, eight microphones 201-1 are two-dimensionally arranged on the top surface of the sound processing device 10 and eight microphones 201-2 are two-dimensionally arranged on the bottom surface of the sound processing device 10.

The sound processing device 10 may acquire sound signals recorded by the microphones 201-1 at the f-th frame and may acquire sound signals recorded by the microphones 201-2 at the (f+1)-th frame. Even with this configuration, the sound processing device 10 can estimated the azimuth and the elevation angle of a sound source Sp based on the sound signals recorded by the microphones 201 at two frames and the angular velocity detected by the sensor 30.

In FIG. 7, the number of microphones 201 may be set to 8 and the sound processing device 10 may move the eight microphones 201 at the f-th frame to the positions of the microphones 201-1 and may move the eight microphones 201 at the (f+1)-th frame to the positions of the microphones 201-2. Even with this configuration, the sound processing device 10 can estimate the azimuth and the elevation angle of the sound source Sp based on the sound signals recorded by the microphones 201 at two frames and the angular velocity detected by the sensor 30. The direction of the sound processing device 10 with respect to the sound source Sp can be understood.

Second Embodiment

The first embodiment has described the example where the azimuth and the elevation angle of a sound source are estimated based on the sound signals acquired at two frames and the rotation angle information as the posture information of the device.

In a second embodiment, a sound source position is estimated by smoothing and optimizing sound source positions estimated at a plurality of frames using a Bound Optimization BY Quadratic Approximation (BOBYQA) method (for example, see Non-patent Document 1).

Non-patent Document 1: M. J. D. Powell, "The BOBYQA algorithm for bound constrained optimization without derivatives", Report DAMTP 2009/NA06, 2009

Figure 8:
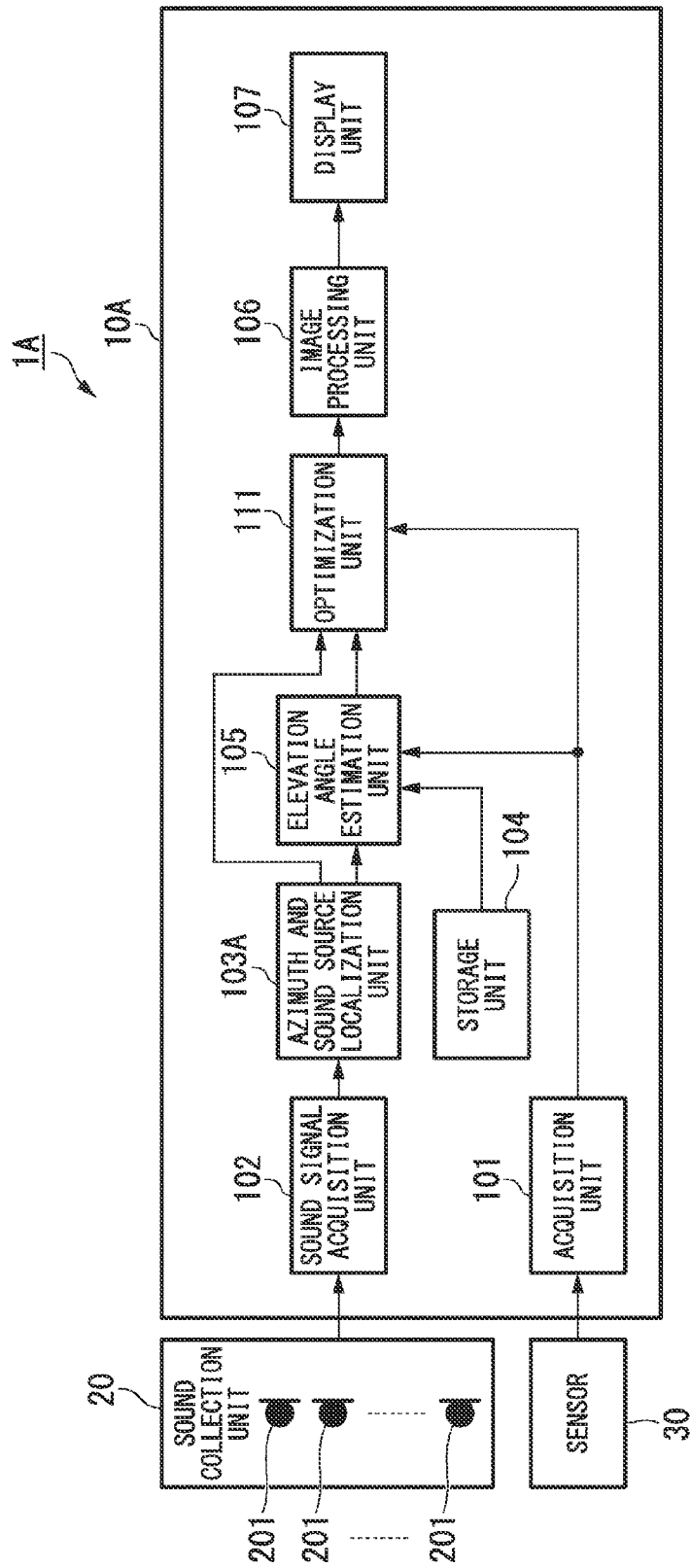
FIG. 8 is a block diagram showing a configuration of a sound processing device according to a second embodiment of the present invention.

FIG. 8 is a block diagram showing a configuration of a sound processing device 10A according to the second embodiment. As shown in FIG. 8, the sound processing device 10A includes an acquisition unit (tilt information acquisition unit) 101, a sound signal acquisition unit 102, an azimuth and sound source localization unit (azimuth estimation unit) 103A, a storage unit 104, an elevation angle estimation unit 105, an image processing unit 106B, a display unit 107, and an optimization unit 111. The sound processing device 10A is connected to a sound collection unit 20 and a sensor 30. The functional units having the same functions as in the sound processing device 10 (see FIG. 2) will be referenced by the same reference signs and a description thereof will not be repeated.

The acquisition unit 101 acquires the rotation angle information or the angular velocity information detected by the sensor 30 and outputs the acquired rotation angle information or the acquired angular velocity information to the elevation angle estimation unit 105 and the optimization unit 111.

The azimuth and sound source localization unit 103A sequentially estimates the azimuths $\theta_D(f+0)$ to $\theta_D(f+K)$ of a sound source Sp at the f-th frame to (f+K)-th frame (where K is an integer of 2 or greater) based on the input signal input from the sound signal acquisition unit 102, and outputs the information indicating the estimated azimuths $\theta_D(f+0)$ to $\theta_D(f+K)$ to the elevation angle estimation unit 105 and the optimization unit 111.

The elevation angle estimation unit 105 calculates the rotation matrix R(f) at the f-th frame using the rotation angle information or the angular velocity information at the f-th frame. Then, the elevation angle estimation unit 105 calculates the rotation matrix $R^T(f+1)$ at the (f+1)-th frame using the rotation angle information or the angular velocity information at the (f+1)-th frame. Then, the elevation angle estimation unit 105 calculates a matrix $R^T(f+1)R(f)$ which is the multiplied product of the calculated rotation matrix $R^T(f+1)$ and the calculated rotation matrix R(f). The elevation angle estimation unit 105 estimates the elevation angle $\phi_D(f)$ at the f-th frame using the azimuth $\theta_D(f)$ at the f-th frame and the azimuth $\theta_D(f+1)$ at the (f+1)-th frame input from the azimuth and sound source localization unit 103, Expression (11) for estimating the elevation angle, which is stored in the storage unit 104, and the elements of the calculated matrix $R^T(f+1)R(f)$.

The elevation angle estimation unit 105 calculates the rotation matrix R(f+K) at the (f+K)-th frame using the rotation angle information or the angular velocity information at the (f+K)-th frame from n=1 to n=K. The elevation angle estimation unit 105 calculates the rotation matrix $R^T(f+K+1)$ at the (f+K+1)-th frame using the rotation angle information or the angular velocity information at the (f+K+1)-th frame. The elevation angle estimation unit 105 calculates a matrix $R^T(f+K+1)R(f+K)$ which is the multiplied product of the calculated rotation matrix $R^T(f+K+1)$ and the calculated rotation matrix R(f+K). The elevation angle estimation unit 105 estimates the elevation angle $\phi_D(f+K)$ at the (f+K)-th frame using the azimuth $\theta_D(f+K)$ at the (f+K)-th frame and the azimuth $\theta_D(f+K-1)$ at the (f+K-1)-th frame input from the azimuth and sound source localization unit 103, Expression (11) for estimating the elevation angle, which is stored in the storage unit 104, and the elements of the calculated matrix $R^T(f+K+1)R(f+K)$.

The elevation angle estimation unit 105 outputs information indicating the estimated elevation angles $\phi_D(f+0)$ to $\phi_D(f+K)$ at the f-th to (f+K)-th frames to the optimization unit 111.

The azimuths $\theta_D(f+0)$ to $\theta_D(f+K)$ at the f-th to (f+K)-th frames from the azimuth and sound source localization unit 103 and the elevation angles $\phi_D(f+0)$ to $\phi_D(f+K)$ at the f-th to (f+K)-th frames from the elevation angle estimation unit 105 are input to the optimization unit 111. Here, a combination of the azimuth $\theta_D(f)$ at the f-th frame estimated by the azimuth and sound source localization unit 103 and the elevation angle $\phi_D(f)$ at the f-th frame estimated by the elevation angle estimation unit 105 is defined as a sound source position $P_W(f)$ at the f-th frame. A combination of the azimuth $\theta_D(f+K)$ at the (f+K)-th frame estimated by the azimuth and sound source localization unit 103 and the elevation angle $\phi_D(f+K)$ at the (f+K)-th frame estimated by the elevation angle estimation unit 105 is defined as a sound source position $P_W(f+K)$ at the (f+K)-th frame.

The optimization unit 111 calculates the sound source position $P_W\hat{}(f+K)$ having a minimum square error, for example, using the BOBYQA method, out of the sound source positions $P_W(f+0)$ to $P_W(f+K)$ at the f-th to (f+K)-th frames. The optimization unit 111 outputs the calculated sound source position $P_W\hat{}(f+K)$ to the image processing unit 106. The second embodiment describes the example using the BOBYQA method; however, another method may be used.

The image processing unit 106 displays an image indicating the sound source position $P_W\hat{}(f+K)$ input from the optimization unit 111 on the display unit 107.

The method of calculating the sound source position $P_W\hat{}(f+K)$ having the minimum square error using the BOBYQA method, which is performed by the optimization unit 111, will be described below.

Figure 9:
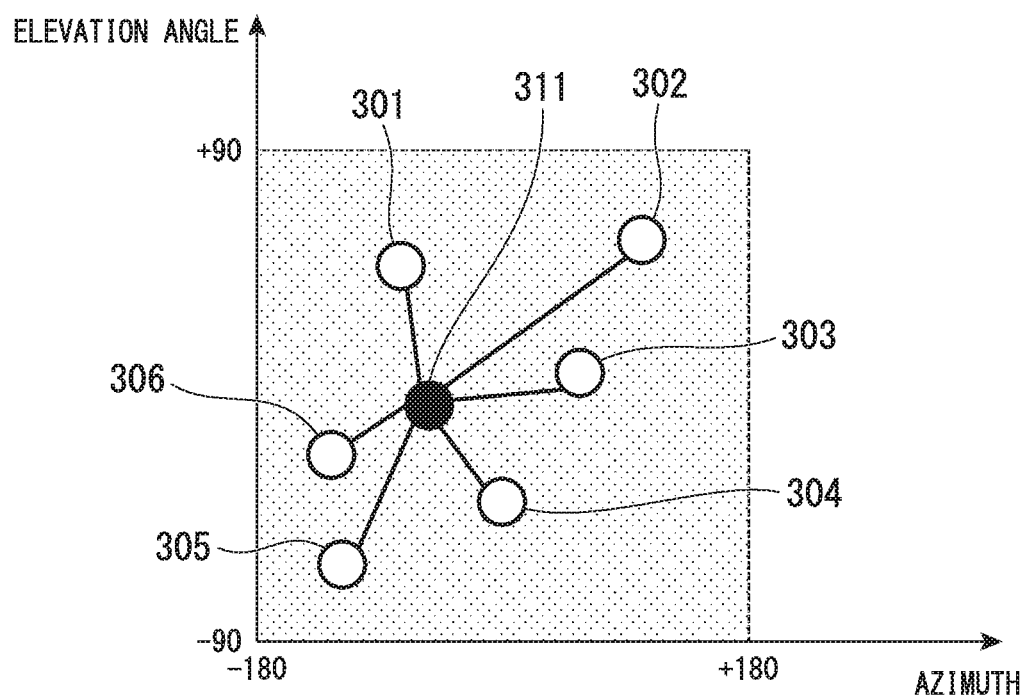
FIG. 9 is a diagram showing an optimization process in the second embodiment.

FIG. 9 is a diagram showing an optimization process in the second embodiment. FIG. 9 shows an example where K is set to 6. In FIG. 9, images indicated by reference numerals 301 to 306 represent the sound source positions $P_W(f+0)$ to $P_W(f+K)$ at the (f+0)-th to (f+6)-th frames. An image indicated by reference numeral 311 represents the sound source position $P_W\hat{}(f+K)$ having the minimum square error out of the sound source positions $P_W(f+0)$ to $P_W(f+K)$. The horizontal axis represents the azimuth and the vertical axis represents the elevation angle.

As shown in FIG. 9, a constraint condition for the azimuth is −180 degrees to +180 degrees. The constraint condition for the elevation angle is −90 degrees to +90 degrees.

The optimization unit 111 calculates the sound source position $P_W\hat{}(f+6)$ having the minimum square error in the constraint condition out of the sound source positions $P_W(f+0)$ to $P_W(f+6)$ at the (f+0)-th to (f+6)-th frames by optimization using the BOBYQA method. The sound source position $P_W\hat{}(f+K)$ calculated in this manner is less affected by (more robust to) disturbance noise or the like than the sound source position $P_W(f+K)$ estimated using two frames.

Figure 10:
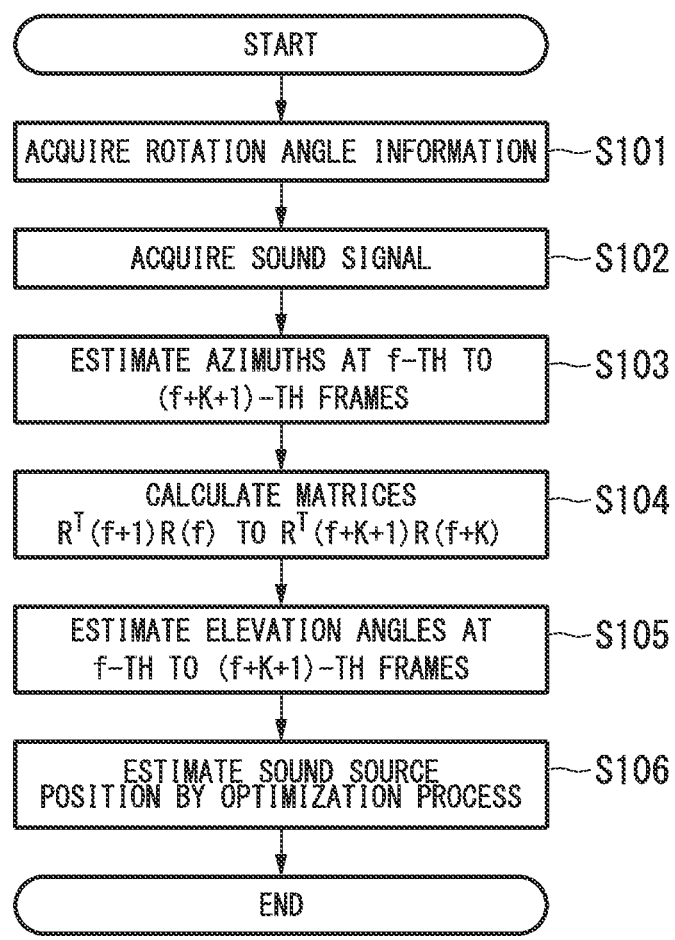
FIG. 10 is a flowchart showing a process flow of the sound processing device according to the second embodiment.

FIG. 10 is a flowchart showing the flow process in the sound processing device 10A according to the second embodiment. In the following example, the acquisition unit 101 acquires the rotation angle information.

(Step S101) The acquisition unit 101 acquires the rotation angle information detected by the sensor 30 at the f-th to (f+K+1)-th frames and outputs the acquired rotation angle information at the f-th to (f+K+1)-th frames to the elevation angle estimation unit 105. After the process of step S101 ends, the acquisition unit 101 transfers the process flow to step S102.

(Step S102) The sound signal acquisition unit 102 acquires the sound signals of N channels recorded by the sound collection unit 20 at the f-th to (f+K+1)-th frames. After the process of step S102 ends, the sound signal acquisition unit 102 transfers the process flow to step S103.

(Step S103) The azimuth and sound source localization unit 103A estimates the azimuth azimuths $\theta_D(f)$ to $\theta_D(f+K)$ at the f-th to (f+K)-th frames based on the input signals output from the sound signal acquisition unit 102 and outputs the estimated azimuths $\theta_D(f)$ to $\theta_D(f+K)$ at the f-th to (f+K)-th frames to the elevation angle estimation unit 105 and the optimization unit 111. After the process of step S103 ends, the azimuth and sound source localization unit 103A transfers the process flow to step S104.

(Step S104) The elevation angle estimation unit 105 calculates rotation matrices R(f) to R(f+K) at the f-th to (f+K)-th frames using the rotation angle information at the f-th to (f+K)-th frames. Then, the elevation angle estimation unit 105 calculates rotation matrices $R^T(f+1)$ to $R^T(f+K+1)$ at the (f+1)-th to (f+K+1)-th frames using the rotation angle information at the (f+1)-th to (f+K+1)-th frames. Then, the elevation angle estimation unit 105 calculates matrices $R^T(f+1)R(f)$ to $R^T(f+K+1)R(f+K)$ which are the multiplied products of the calculated rotation matrices $R^T(f+1)$ to $R^T(f+K+1)$ and the calculated rotation matrices R(f) to R(f+K). After the process of step S104 ends, the elevation angle estimation unit 105 transfers the process flow to step S105.

(Step S105) The elevation angle estimation unit 105 estimates the elevation angles $\phi_D(f)$ to $\phi_D(f+K)$ at the f-th to (f+K)-th frames using the azimuths $\theta_D(f)$ to $\theta_D(f+K)$ at the f-th to (f+K)-th frames input from the azimuth and sound source localization unit 103, Expression (11) for estimating the elevation angle, which is stored in the storage unit 104, and the elements of the calculated matrices $R^T(f+1)R(f)$ to $R^T(f+K+1)R(f+K)$. Then, the elevation angle estimation unit 105 outputs information indicating the estimated elevation angles $\phi_D(f)$ to $\phi_D(f+K)$ at the f-th to (f+K)-th frames to the optimization unit 111. After the process of step S105 ends, the elevation angle estimation unit 105 transfers the process flow to step S106.

(Step S106) The optimization unit 111 calculates the sound source position $P_W\hat{}(f+K)$ having the minimum square error in the constraint condition out of the sound source positions $P_W(f)$ to $P_W(f+K)$ at the f-th to (f+K)-th frames by optimization using the BOBYQA method.

Then, the image processing unit 106 displays an image indicating the sound source position $P_W\hat{}(f)$ input from the optimization unit 111 on the display unit 107.

The process flow of estimating an elevation angle ends in this manner.

As described above, in the sound processing device 10A according to the second embodiment, the elevation angle estimation unit 105 smoothes the elevation angles estimated at a plurality of times (frames) and determines the smoothed value as the elevation angle of the sound source.

According to this configuration, the sound processing device 10A according to the second embodiment can estimate the azimuth and the elevation angle so as to be more robust to disturbance, compared with the method of using sound signals and posture information acquired at two frames.

Third Embodiment

The first embodiment and the second embodiment have described the example where the estimated azimuth and the estimated elevation angle are displayed on the display unit 107, and a third embodiment of the present invention describes an example where the direction of a sound source Sp is displayed on the display unit 107 based on the estimated azimuth and the elevation angle.

Figure 11:
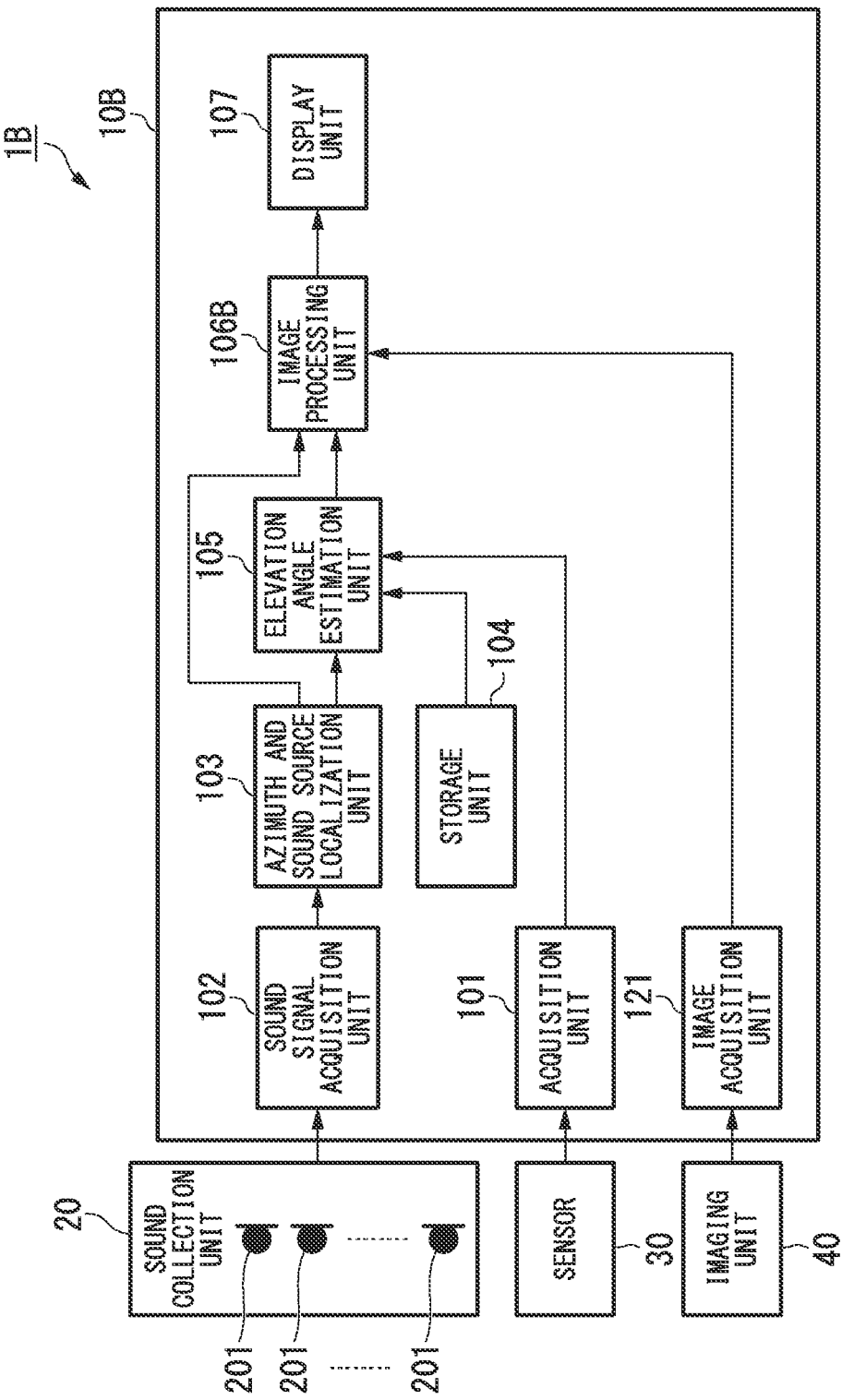
FIG. 11 is a block diagram showing a configuration of a sound processing device according to a third embodiment of the present invention.

FIG. 11 is a block diagram showing a configuration of a sound processing device 10B according to the third embodiment. As shown in FIG. 11, the sound processing device 10B includes an acquisition unit (tilt information acquisition unit) 101, a sound signal acquisition unit 102, an azimuth and sound source localization unit (azimuth estimation unit) 103, a storage unit 104, an elevation angle estimation unit 105, an image processing unit 106B, a display unit 107, and an image acquisition unit 121. The sound processing device 10B is connected to a sound collection unit 20, a sensor 30, and an imaging unit 40. The functional units having the same functions as in the sound processing device 10 (see FIG. 2) will be referenced by the same reference signs and a description thereof will not be repeated.

The imaging unit 40 captures an image of a subject and generates an image signal indicating the captured image.

The imaging unit 40 is configured by, for example, a charge coupled device (CCD) camera or a complementary metal oxide semiconductor (CMOS) camera. The imaging unit 40 is disposed, for example, on the front surface of the sound processing device 10B. The imaging unit 40 outputs the generated image signal to the sound processing device 10B.

The image acquisition unit 121 acquires the image signal output from the imaging unit 40 and converts the acquired image signal into a digital signal. The image acquisition unit 121 outputs the image signal, which has been converted into the digital signal, to the image processing unit 106B. It is preferable that the timing at which the image acquisition unit 121 acquires the image signal be synchronized with the timing at which the sound signal acquisition unit 102 acquires the sound signal.

The image processing unit 106B generates information indicating the direction of a sound source Sp based on the azimuth information input from the azimuth and sound source localization unit 103 and the elevation angle information input from the elevation angle estimation unit 105. The image processing unit 106B determines whether an image signal is input from the image acquisition unit 121. When an image signal is input, the image processing unit 106B synthesizes an image based on the generated information indicating the direction of the sound source Sp with the image signal and displays the synthesized image signal on the display unit 107. When an image signal is not input, the image processing unit 106B displays an image based on the generated information indicating the direction of the sound source Sp on the display unit 107.

An example of an image displayed on the display unit 107 will be described below.

Figure 12:
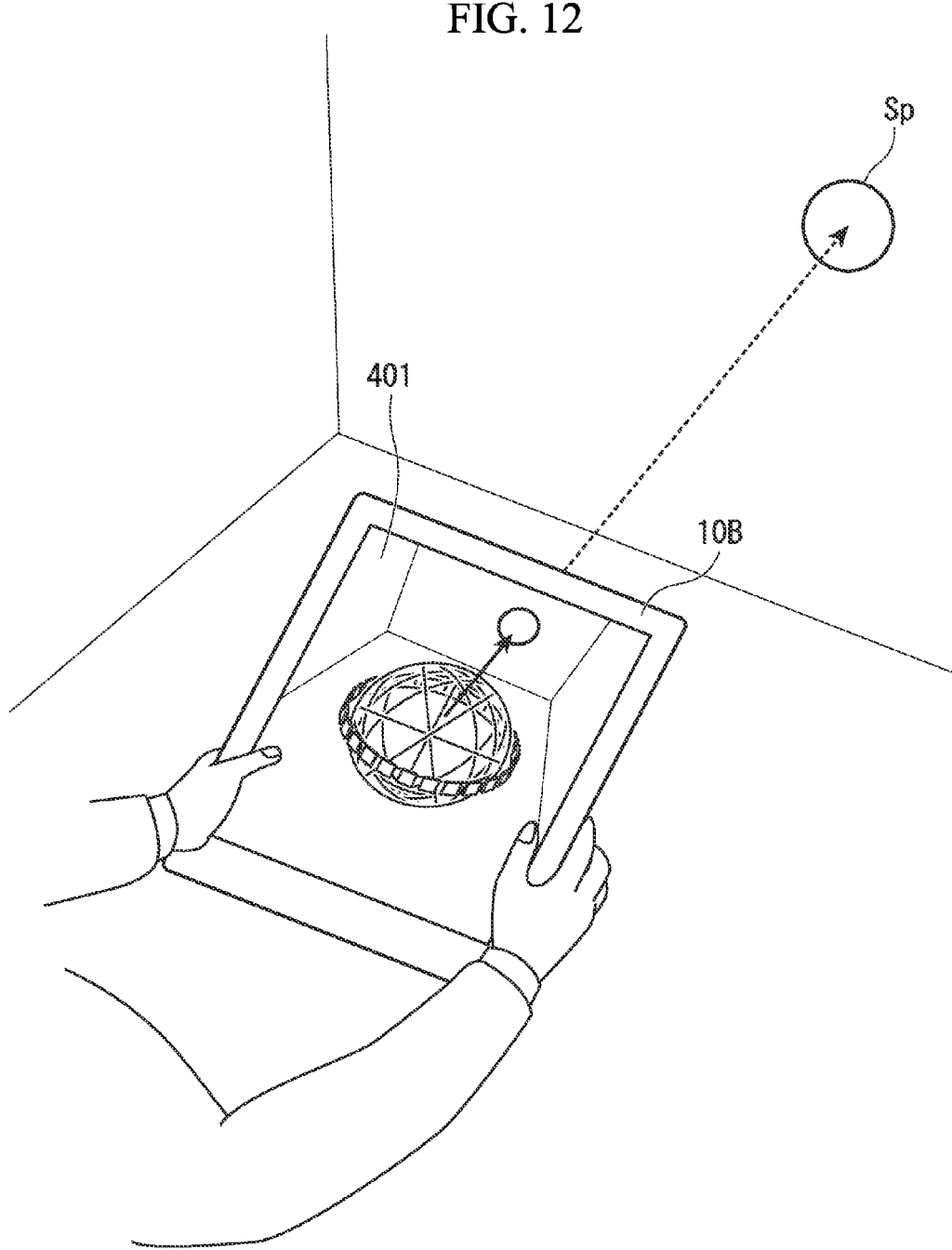
FIG. 12 is a diagram showing an example of an image displayed on a display unit in the third embodiment.

FIG. 12 is a diagram showing an example of an image displayed on the display unit 107 in the third embodiment.

In the example shown in FIG. 12, a user searches for the direction of a sound source Sp with the sound processing device 10B carried with a hand. The user moves the sound processing device 10B to the up, down, right, and left sides with the front surface of the sound processing device 10B directed to the front side of the user. An image indicating a sound source position estimated using the method described in the first embodiment or the method described in the second embodiment based on the sound signal and the rotation angle information (or the angular velocity) in which the position of the sound processing device 10B is changed by the user depending on the frames is displayed on the display unit 107. The user can see the direction of the sound source Sp with reference to the image 401 displayed on the display unit 107 of the sound processing device 10B.

Figure 13:
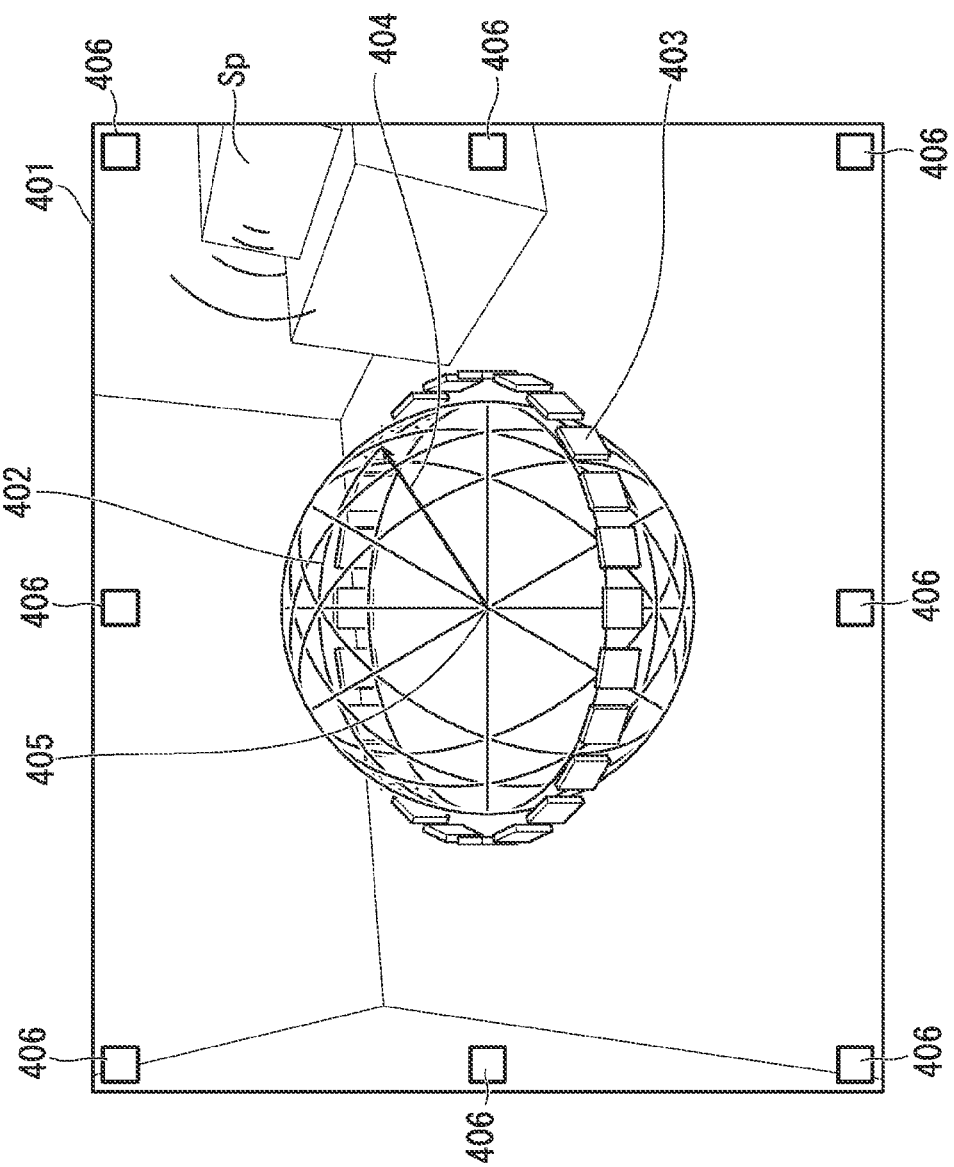
FIG. 13 is a diagram showing an image which is obtained by synthesizing an image captured by an imaging unit with an image based on information indicating a direction of a sound source and which is displayed on the display unit in the third embodiment.

FIG. 13 is a diagram showing an image which is obtained by synthesizing the image captured by the imaging unit 40 with the image based on the information indicating the direction of the sound source Sp and which is displayed on the display unit 107 in the third embodiment.

In FIG. 13, the image denoted by reference numeral 402 is an image having a spherical shape. The image denoted by reference numeral 403 is an image which has, for example, a ring-shaped shape and which is displayed around the outline of a cross-section passing through the center of the spherical image denoted by the reference numeral 402. The image denoted by reference numeral 403 represents a horizontal plane in the world coordinate system. The images denoted by reference numerals 402 and 403 are auxiliary images for easily intuitively recognizing the direction of the sound source Sp. The image denoted by reference numeral 404 is an image having an arrow shape based on the information indicating the direction of the sound source Sp. The image denoted by reference numeral 405 is an image indicating the center of the spherical image 402. In the following description, the image denoted by reference numeral 402 is referred to as spherical image 402, the image denoted by reference numeral 403 is referred to as ring-shaped image 403, and the image denoted by reference numeral 404 is referred to as arrow 404.

As shown in FIG. 13, an image obtained by synthesizing the spherical image 402, the ring-shaped image 403, and the arrow 404 with the image captured by the imaging unit 40 is displayed on the display unit 107. Accordingly, the arrow 404 varies with the movement of the sound processing device 10B so that the direction of the arrowhead of the arrow 404 and the length of the arrow 404 indicate the direction of the sound source Sp. Accordingly, a user can easily intuitively recognize what direction in a three-dimensional space the arrow 404 indicates.

That is, an image formed by the spherical image 402 and the ring-shaped image 403 is an image of a virtual gyroscope in which the spherical image 402 is stabilized so that the ring-shaped image 403 around the outline corresponding to the equator when the sphere is assumed to be the earth is normally displayed on the horizontal plane.

In the example shown in FIG. 13, the number of sound sources Sp is one; however, a plurality of arrows 404 may be included in the image 401 when the number of sound sources is two or more.

A display example where the number of sound sources is two or more will be described below.

Figure 14:
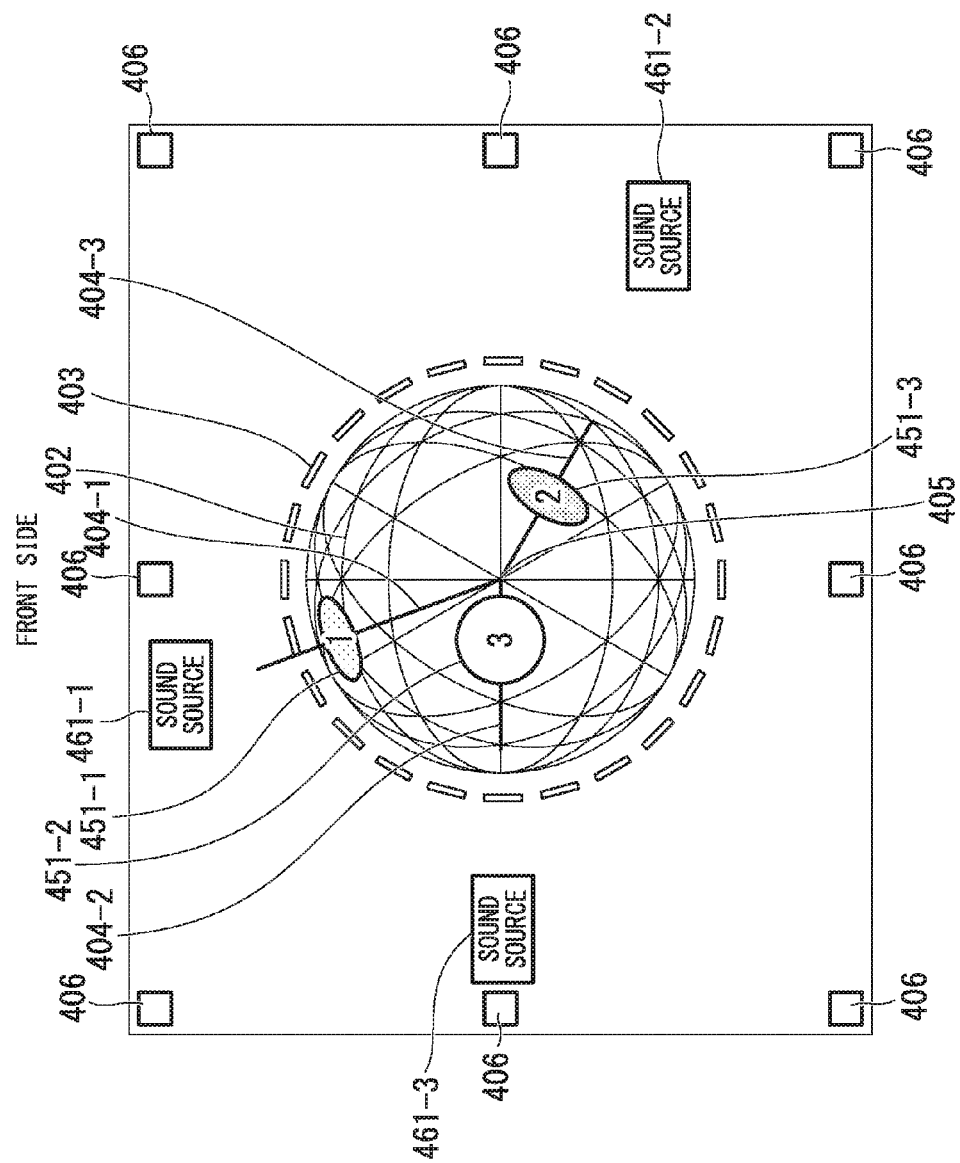
FIG. 14 is a diagram showing a display example when a plurality of sound sources are detected in the third embodiment.

FIG. 14 is a diagram showing a display example when two or more sound sources are detected in the third embodiment. FIG. 14 shows a display example when three sound sources Sp-1 to Sp-3 are detected. In the example shown in FIG. 14, one side in the longitudinal direction of the sound processing device 10B is set as the front side. In the example shown in FIG. 14, the image indicating the estimated directions of the sound sources is displayed without being synthesized with the image captured by the imaging unit 40. The same images as shown in FIG. 13 will be referenced by the same reference numerals and a description thereof will not be repeated.

In FIG. 14, the images denoted by reference numerals 406 are images corresponding to the microphones 201 mounted on the sound processing device 10B. The images denoted by reference numerals 406 do not have to be displayed on the display unit 107.

The images denoted by reference numerals 461-1 to 461-3 are images corresponding to the sound sources Sp-1 to Sp-3. For example, when the sound types of the sound signals by sound sources separated by the azimuth and sound source localization unit 103 are determined by a speech recognizing unit (not shown) of the sound processing device 10B, the images denoted by reference numerals 461-1 to 461-3 may be images corresponding to the types of the sound sources. Here, examples of the type of a sound source include a speech uttered by a person, a crying sound uttered by an animal, and a sound emitted from a machine. Examples of the image corresponding to the type of a sound source include an illustration of a person, an illustration of an animal, and an illustration of a phone.

The images denoted by reference signs 404-1 to 404-3 are images indicating the estimated directions (azimuths and elevation angles) of the sound sources Sp-1 to Sp-3.

The images denoted by reference numerals 451-1 to 451-3 are numbers allocated to the sound sources. As shown in FIG. 14, the images denoted by reference numerals 451-1 to 451-3 indicate the azimuths and the elevation angles of the sound sources along with the arrows 404-1 to 404-3. These numbers may be allocated by the image processing unit 106C.

The image denoted by reference numeral 451-1 is an image having a light gray color and having an elliptical shape in which the direction from the central image 405 to the sound source Sp-1 is a minor diameter direction. The image denoted by reference numeral 451-1 represents that the azimuth of the sound source Sp-1 substantially corresponds to the front side of the sound processing device 10B and the elevation angle thereof is, for example, −10 degrees from the horizontal plane.

The image denoted by reference numeral 451-2 is an image having a white color and a circular shape. The image denoted by reference numeral 451-2 represents that the azimuth of the sound source Sp-2 substantially corresponds to the left side of the sound processing device 10B and the elevation angle thereof is, for example, +45 degrees from the horizontal plane.

The image denoted by reference numeral 451-3 is an image having a gray color darker than that of the image denoted by reference numeral 451-1 and having an elliptical shape in which the direction from the central image 405 to the sound source Sp-3 is a minor diameter direction. The image denoted by reference numeral 451-3 represents that the azimuth of the sound source Sp-2 substantially corresponds to the right side of the sound processing device 10B and the elevation angle thereof is, for example, −30 degrees from the horizontal plane.

In this manner, the images denoted by reference numerals 451-1 to 451-3 visually show the elevation angles of the sound sources with respect to the plane on which the microphones 201 are arranged depending on the shapes and the colors.

That is, when the images denoted by reference numerals 451-1 to 451-3 and the central image 405 are displayed closer to each other, it means that the elevation angles thereof are larger. When the images denoted by reference numerals 451-1 to 451-3 and the central image 405 are displayed farther away from each other, it means that the elevation angles thereof are smaller.

When the images denoted by reference numerals 451-1 to 451-3 are white, it means that the elevation angles of the sound sources are in positive directions with respect to the horizontal plane. When the images denoted by reference numerals 451-1 to 451-3 are gray, it means that the elevation angles of the sound sources are in negative directions with respect to the horizontal plane.

The images denoted by reference numerals 451-1 to 451-3 may be images having a size based on the magnitudes of the separated sound signals by sound sources.

As described above, the sound processing device 10B according to the third embodiment includes the display unit 107 configured to display an image and the image processing unit 106B configured to generate an image indicating the elevation angle estimated by the elevation angle estimation unit 105 and to display the generated image on the display unit.

In the sound processing device 10B according to the third embodiment, the image processing unit 106B generates an image indicating the azimuth estimated by the azimuth estimation unit (the azimuth and sound source localization unit 103) and displays the generated image on the display unit 107.

The sound processing device 10B according to the third embodiment further includes the imaging unit 40 configured to capture an image, and the image processing unit 106B synthesizes at least the image indicating the elevation angle with the image captured by the imaging unit and displays the synthesized image on the display unit 107.

According to this configuration, the sound processing device 10B according to the third embodiment can display the azimuth estimated by the azimuth and sound source localization unit 103 and the elevation angle estimated by the elevation angle estimation unit 105 as an image which can be easily intuitively recognized on the display unit 107.

Since the sound processing device 10B according to the third embodiment synthesizes the sound source direction with the image captured by the imaging unit 40 and displays the synthesized image, a user can easily intuitively recognize the sound source direction.

The first to third embodiments described the example where the sound processing device 10 (10A, 10B) estimate the direction (the azimuth and the elevation angle) of the sound source Sp in the device coordinate system and displays information indicating the estimated direction on the display unit 107; however, the present invention is not limited to this example. The sound processing device 10 (10A, 10B) may convert the estimated direction into a relative direction to the device and may display information indicating the converted relative direction to the device on the display unit 107.

Fourth Embodiment

The first to third embodiments have described the example where the direction of a sound source is estimated and the estimated direction of the sound source is displayed on the display unit 107. However, a fourth embodiment of the present invention describes an example where the sound processing device is prompted to the direction of the sound source.

Figure 15:
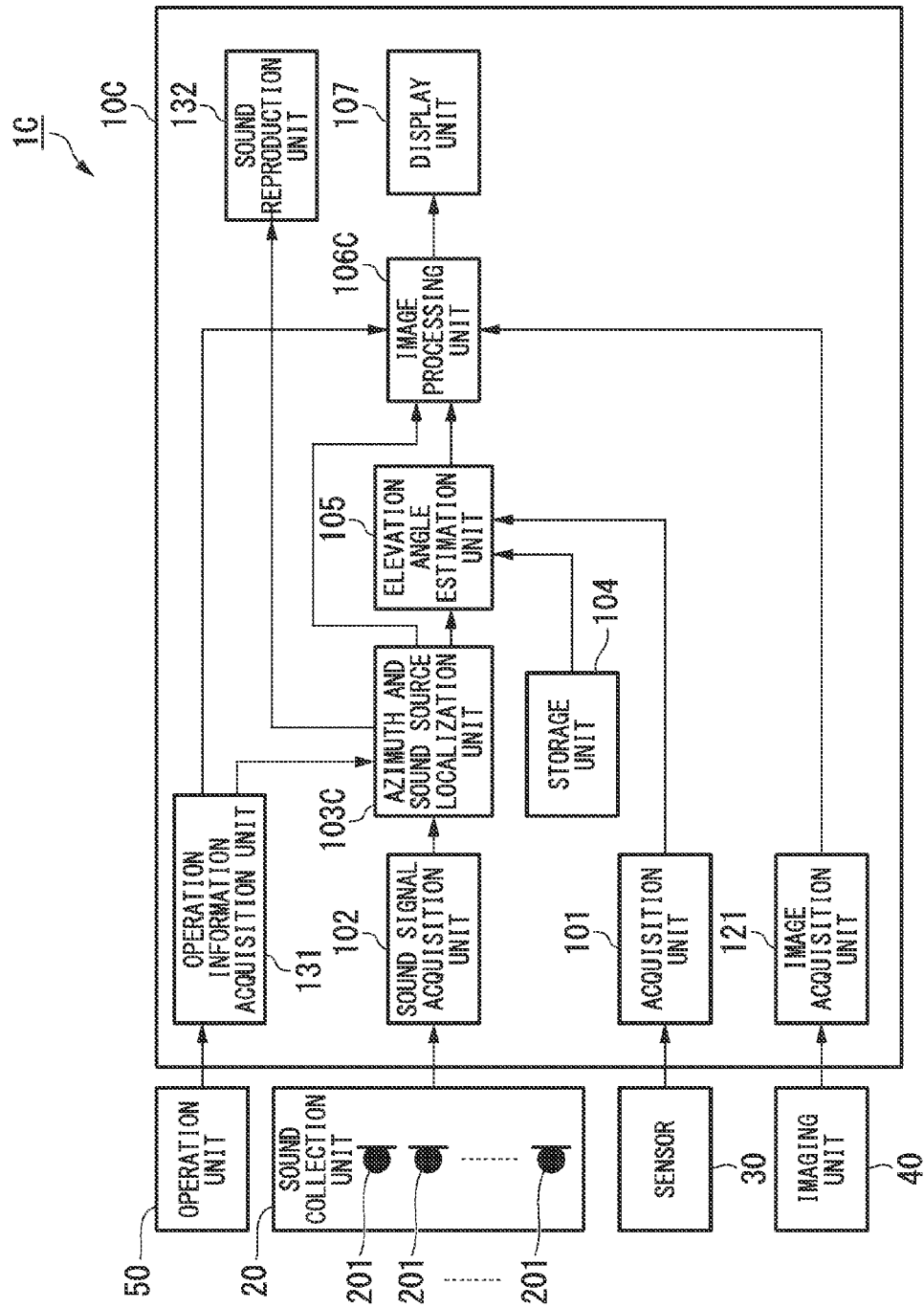
FIG. 15 is a block diagram showing a configuration of a sound processing device according to a fourth embodiment of the present invention.

FIG. 15 is a block diagram showing a configuration of a sound processing device 10C according to the fourth embodiment. As shown in FIG. 15, the sound processing device 10C includes an acquisition unit (tilt information acquisition unit) 101, a sound signal acquisition unit 102, an azimuth and sound source localization unit (azimuth estimation unit) 103C, a storage unit 104, an elevation angle estimation unit 105, an image processing unit 106C, a display unit 107, an image acquisition unit 121, and an operation information acquisition unit 131, and a sound reproduction unit 132. The sound processing device 10C is connected to a sound collection unit 20, a sensor 30, an imaging unit 40, and an operation unit 50. The functional units having the same functions as in the sound processing device 10B (see FIG. 11) will be referenced by the same reference signs and a description thereof will not be repeated.

The operation unit 50 detects an operation result operated by a user and outputs operation information indicating the detected operation result to the sound processing device 10C. The operation unit 50 is, for example, a touch panel mounted on the display unit 107. The operation information includes information indicating a sound source selected by a user and information for reproducing the selected sound source.

The operation information acquisition unit 131 acquires the operation information input from the operation unit 50 and outputs the acquired operation information to the azimuth and sound source localization unit 103C and the image processing unit 106C.

The azimuth and sound source localization unit 103C estimates azimuths of sound sources based on sound signals of N channels input from the sound collection unit 20. The azimuth and sound source localization unit 103C separates sound signals indicating components to which the sound sources contribute from the sound signals of N channels. The azimuth and sound source localization unit 103C uses an existing sound source separating method such as a sound source separating method described in Japanese Unexamined Patent Application, First Publication No. 2012-42953 to separate the sound signals by sound sources. In the below description, sound signals separated by sound sources, that is, sound signals indicating components to the sound sources contribute, are referred to as signals by sound sources.

The azimuth and sound source localization unit 103C generates azimuth information indicating the azimuth of each sound source and outputs the generated azimuth information to the elevation angle estimation unit 105 and the image processing unit 106C.

The azimuth and sound source localization unit 103C outputs the signals by sound sources separated based on the operation information input from the operation information acquisition unit 131 to the sound reproduction unit 132.

The sound reproduction unit 132 reproduces the signals by sound sources input from the azimuth and sound source localization unit 103C. The sound reproduction unit 132 is, for example, a speaker.

The image processing unit 106C generates information indicating the direction of a sound source Sp based on the azimuth information input from the azimuth and sound source localization unit 103C and the elevation angle information input from the elevation angle estimation unit 105. The image processing unit 106C determines whether an image signal is input from the image acquisition unit 121. When an image signal is input, the image processing unit 106C synthesizes an image based on the generated information indicating the direction of the sound source Sp with the image signal and displays the synthesized image signal on the display unit 107. When an image signal is not input, the image processing unit 106C displays an image based on the generated information indicating the direction of the sound source Sp on the display unit 107.

The image processing unit 106C displays an image indicating the selected sound source in a bright color and displays an image indicating the non-selected sound source in a dark color, based on the operation information input from the operation information acquisition unit 131. The image processing unit 106C may display an image indicating the selected sound source in a dark color and may display an image indicating the non-selected sound source in a bright color, based on the operation information input from the operation information acquisition unit 131.

An example where the sound signal of a selected sound source is reproduced will be described below.

Figure 16:
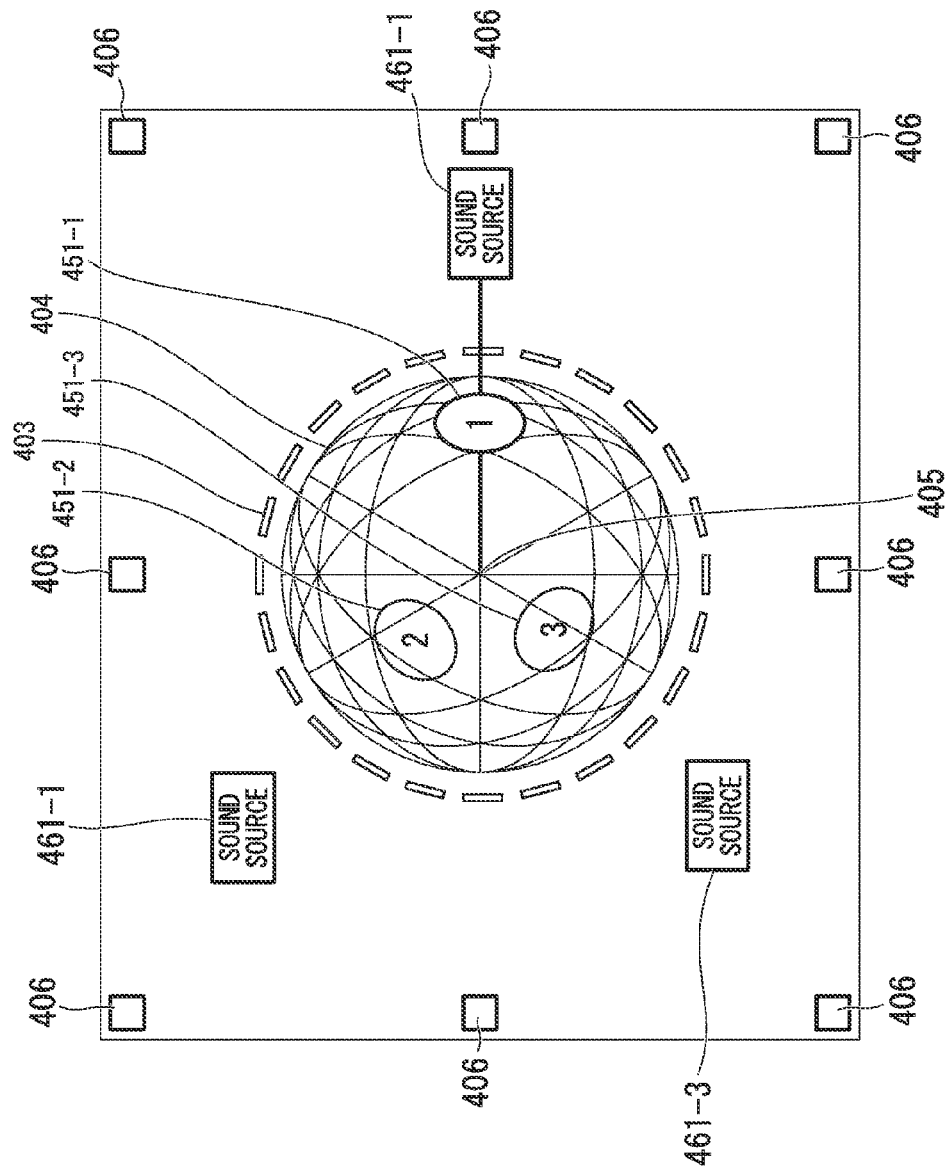
FIG. 16 is a diagram showing an example of an image displayed on a display unit when a sound source is selected in the fourth embodiment.

FIG. 16 is a diagram showing an example of an image which is displayed on the display unit 107 when a sound source is selected in the fourth embodiment. In the example shown in FIG. 16, it is assumed that a sound source Sp-1 is selected by a user. Accordingly, reference numeral 451-1 corresponding to the sound source Sp-1 is displayed in a bright color (for example, white) and reference numerals 451-2 and 451-3 corresponding to non-selected sound sources Sp-2 and Sp-3 are displayed in a dark color (for example, a translucent color). As shown in FIG. 16, images of arrows indicating the directions of the non-selected sound sources Sp-2 and Sp-3 do not have to be displayed on the display unit 107. On the other hand, the arrow 404-1 corresponding to the selected sound source Sp-1 may be displayed to extend to the image 461-3 corresponding to the type of the sound source.

The azimuth and sound source localization unit 103C outputs the signal by sound source corresponding to the selected sound source Sp-1 as shown in FIG. 16 to the sound reproduction unit 132. The azimuth and sound source localization unit 103C may store the separated signals by sound sources in the storage unit 104, and may read the signals by sound sources stored in the storage unit 104 and output the read signal to the sound reproduction unit 132 when a sound source to be reproduced is selected by the user.

As described above, the sound processing device 10C according to the fourth embodiment further includes the sound reproduction unit 132 configured to reproduce a sound signal and the operation information acquisition unit 131 configured to acquire selection information indicating a sound source selected by a user out of the sound signals by sound sources, and the azimuth estimation unit (the azimuth and sound source localization unit 103C) separates the sound signals recorded by the sound collection unit 20 into the sound signals by sound sources, estimates the azimuths of the sound sources based on the separated sound signals by sound sources, and reproduces the sound signal corresponding to the selection information acquired by the operation information acquisition unit out of the separated sound signals through the use of the sound reproduction unit.

According to this configuration, the sound processing device 10C according to the fourth embodiment can reproduce the sound signal of the selected sound source while displaying the direction (the azimuth and the elevation angle) of the sound source selected by the user on the display unit 107.

Fifth Embodiment

The third and fourth embodiments have described the example where the azimuth and the elevation angle of a sound source is displayed on the display unit 107 using the spherical image 402, the ring-shaped image 403, and the arrow 404. However, a fifth embodiment of the present invention describes an example where a direction in which a sound source is present relative to a sound processing device is visually displayed.

Figure 17:
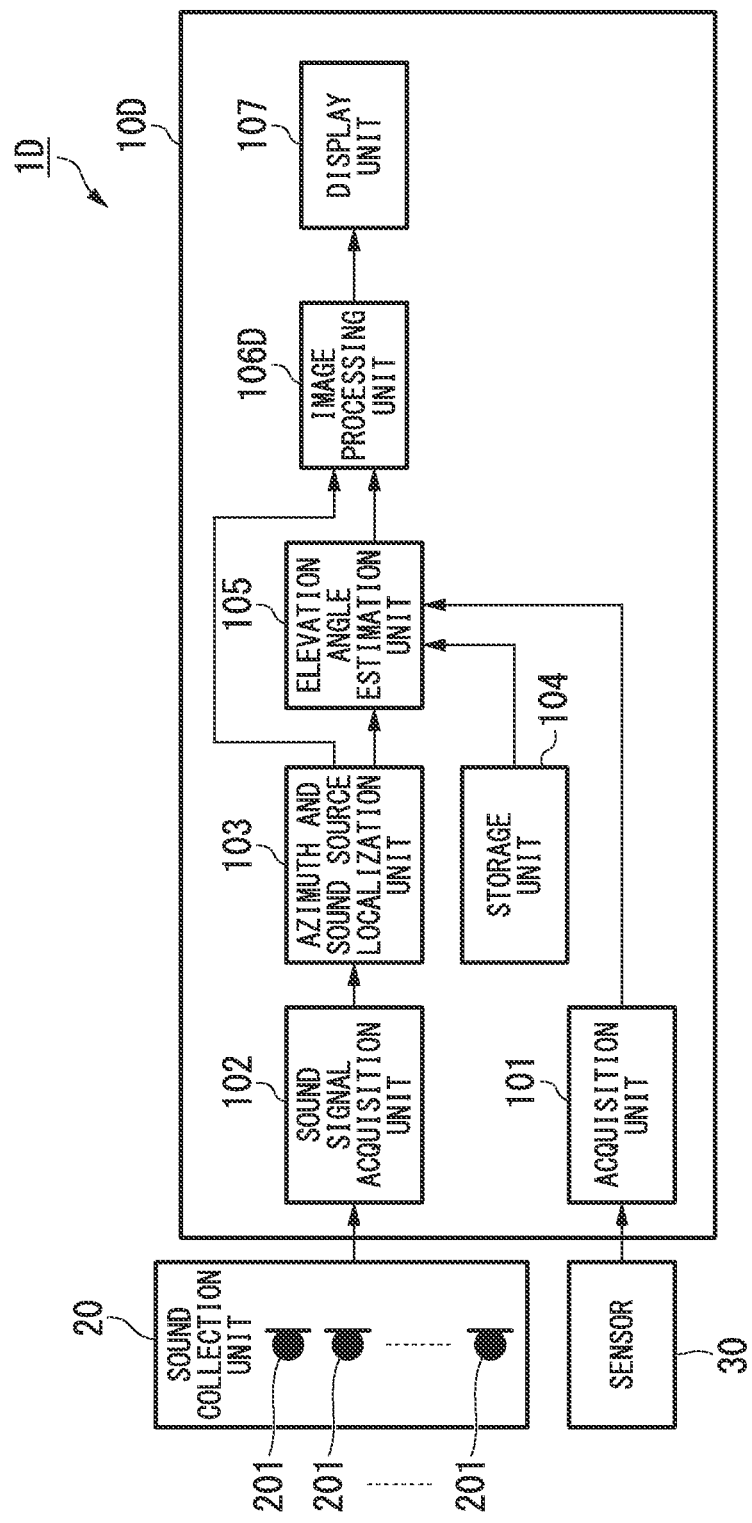
FIG. 17 is a block diagram showing a configuration of a sound processing device according to a fifth embodiment of the present invention.

FIG. 17 is a block diagram showing a configuration of a sound processing device 10D according to the fifth embodiment. As shown in FIG. 17, the sound processing device 10D includes an acquisition unit (tilt information acquisition unit) 101, a sound signal acquisition unit 102, an azimuth and sound source localization unit (azimuth estimation unit) 103, a storage unit 104, an elevation angle estimation unit 105, an image processing unit 106D, and a display unit 107. The functional units having the same functions as in the sound processing device 10 (see FIG. 2) will be referenced by the same reference signs and a description thereof will not be repeated.

The image processing unit 106D changes the depiction of the ring-shaped image 403 (see FIG. 14 or the like) depending on the size of the azimuth estimated by the azimuth and sound source localization unit 103, generates an image indicating the direction of a sound source Sp, and displays the generated image on the display unit 107.

The image processing unit 106D compares the magnitude of the azimuth estimated by the azimuth and sound source localization unit 103 with a predetermined angle and generates an image in which the ring-shaped image 403 displayed on the display unit 107 rotates in the direction indicating the direction of the sound source based on the comparison result. Alternatively, the image processing unit 106D compares the magnitude of the elevation angle estimated by the elevation angle estimation unit 105 with a predetermined angle and generates an image in which the ring-shaped image 403 displayed on the display unit 107 rotates in the direction indicating the direction of the sound source based on the comparison result.

Figure 18:
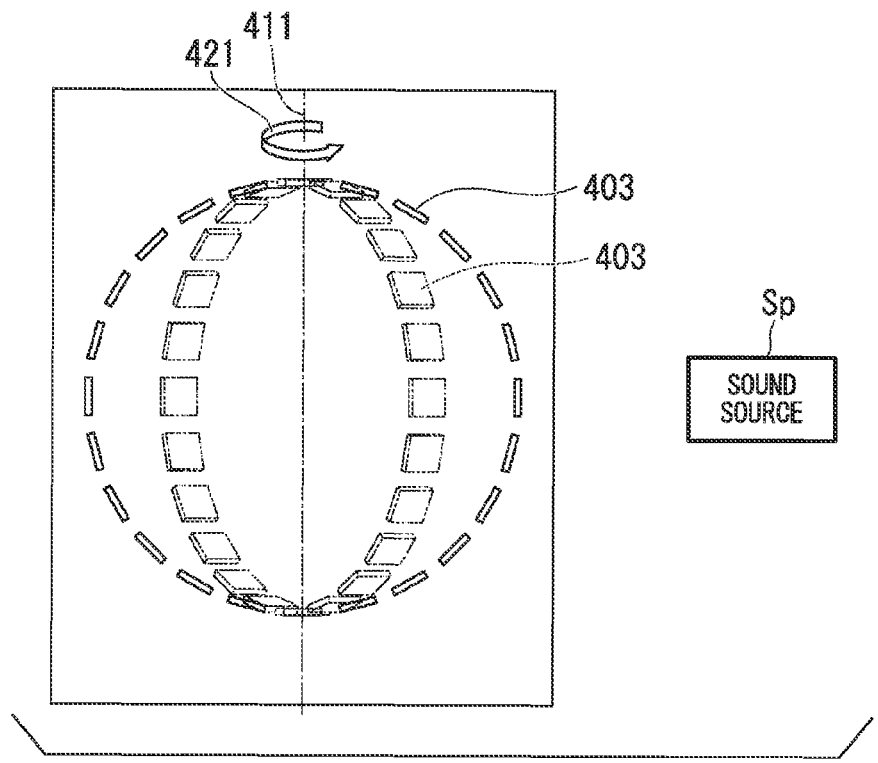
FIG. 18 is a diagram showing a display example of a ring image in the fifth embodiment.
Figure 19:
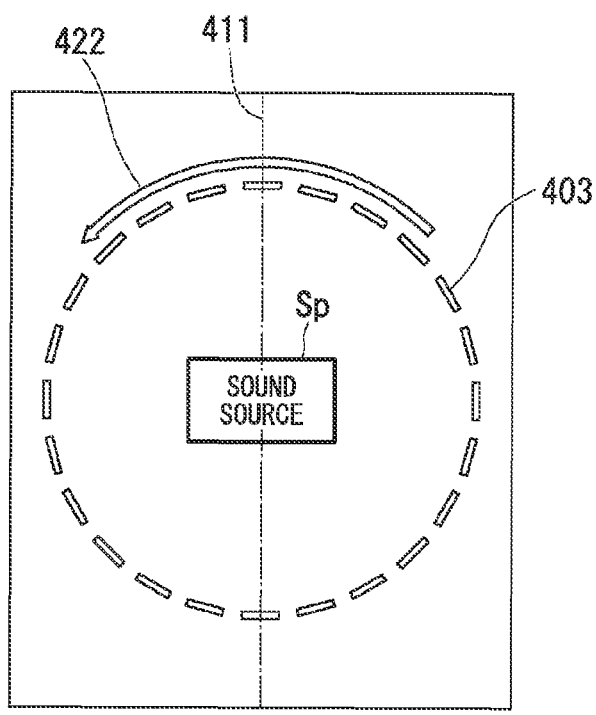
FIG. 19 is a diagram showing another display example of the ring image in the fifth embodiment.

FIGS. 18 and 19 are diagrams showing a depiction example of the ring-shaped image 403 in the fifth embodiment.

When a sound source Sp is located on the right side of the sound processing device 10D as shown in FIG. 18, the ring-shaped image 403 is displayed on the display unit 107 so as to rotate about a segment 411 connecting the centers of the short sides of the display unit 107 as indicated by an arrow 421. The ring-shaped image 403 is displayed on the display unit 107 so as to stop the rotation when the sound processing device 10D is located on the front side of the sound source Sp. The ring-shaped image 403 may be displayed so as to rotate most rapidly, for example, when the azimuth of the sound source is 45 degrees or more and so as to rotate less rapidly as the azimuth of the sound source becomes smaller.

By this display, it is possible to visually recognize the direction in which the sound source Sp is located relative to the sound processing device 10D. A user can recognize the direction of the sound source by moving the sound processing device 10D based on this display.

When the azimuth or the elevation angle of the sound source Sp reaches the front side of the sound processing device 10D, the image processing unit 106D may display the ring-shaped image 403 on the display unit 107 so as to rotate in the counterclockwise direction as indicated by the arrow 422 as shown in FIG. 19 for the purpose of notifying a user that the sound processing device 10D reaches the azimuth or the elevation angle of the sound source Sp.

By this display, a user can visually recognize that the sound source Sp is located on the front side of the sound processing device 10D.

As described above, in the sound processing device 10D according to the fifth embodiment, the image processing unit 106D generates an image that varies at a speed based on the azimuth estimated by the azimuth estimation unit (the azimuth and sound source localization unit 103) or the elevation angle estimated by the elevation angle estimation unit 105.

According to this configuration, the sound processing device 100D according to the fifth embodiment can search for the direction (the azimuth and the elevation angle) of a sound source by causing a user to move the sound processing device 10D while viewing the image displayed on the display unit 107.

The fifth embodiment has described the example where the direction of a sound source Sp is displayed for a user using the ring-shaped image 403 as shown in FIGS. 18 and 19; however, the present invention is not limited to this example. The shape of the image indicating the direction of a sound source Sp does not have to be ring-shaped and may be polygonal. The direction of a sound source Sp may be notified using written characters or voice.

The fifth embodiment has described the example where the direction of a sound source Sp is displayed using the ring-shaped image 403 as shown in FIGS. 18 and 19; however, the present invention is not limited to this example.

For example, in the image 401 shown in FIGS. 13 and 14, the ring-shaped image 403 may be displayed so as to rotate, for example, depending on the azimuth. For example, when the sound source Sp is located on the left side relative to the sound processing device 10B, the sound processing device 10B may display the ring-shaped image 403 so as to rotate in the counterclockwise direction to relatively move the sound processing device 10B. Alternatively, when a sound source Sp is located on the right side relative to the sound processing device 10B, the sound processing device 10B may display the ring-shaped image 403 so as to rotate in the clockwise direction to relatively move the sound processing device 10B.

The speed at which the ring-shaped image 403 rotates may be changed depending on the magnitude of the azimuth with respect to the sound processing device 10B. For example, when the azimuth is different by 45 degrees or more, the sound processing device 10B may display the ring-shaped image 403 so as to rotate most rapidly. As the azimuth gets closer to 0 degrees from 45 degrees, the sound processing device 10B may display the ring-shaped image 403 so as to rotate less rapidly.

Test Result

A test result of evaluation of performance of an image displayed on the display unit 107 using the sound processing device 10A according to the second embodiment will be described below. A geomagnetic sensor and an acceleration sensor were used as the sensor 30. The test was carried out by applying the sound processing device 10A to a tablet terminal. Eight microphones 201 were arranged on the rear surface of the tablet terminal as shown in FIG. 1. Speech data was used for the test.

Figure 20:
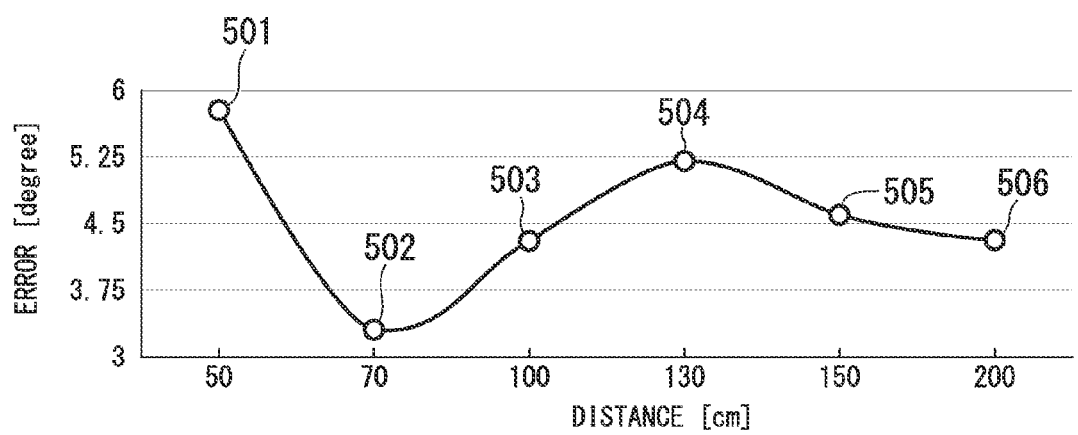
FIG. 20 is a diagram showing a relationship between a distance and an error in a test result.

FIG. 20 is a diagram showing a relationship between a distance and an error in the test result.

As the result of a test using sound sources arranged at different positions on a semicircle with a radius of 50 cm, the average value of errors was about 5.8 degrees as indicated by point 501 in FIG. 20 as the accuracy of one-dimensional sound source localization.

As the result of tests using sound sources arranged at different positions on semicircles with a radius of 70 cm, 100 cm, 130 cm, 150 cm, and 200 cm, the average values of errors were about 3.2 degrees, 4.3 degrees, 5.2 degrees, 4.6 degrees, and 4.3 degrees, respectively, as indicated by points 502 to 506 in FIG. 20 as the accuracy of one-dimensional sound source localization.

In FIG. 20, the reason why the error at the radius of 50 cm was larger than at the other radii is thought to be that since the sound source Sp is close to the sound processing device 10A, it is difficult to consider the sound source as a point sound source.

The first to fifth embodiments have described the example where the number of microphones 201 is eight; however, the present invention is not limited to this example. As described above, in the present invention, sound signals and device tilt at different frames are acquired and the azimuth and the elevation angle are estimated. Accordingly, in the present invention, the number of microphones 201 can be one or more.

For example, when the number of microphones 201 is one, the azimuth and sound source localization unit 103 (103A, 103C) estimates the azimuth at the f-th frame or the (f+1)-th frame based on the sound signals at the f-th frame and the (f+1)-th frame, and estimates the azimuth at the (f+2)-th frame or the (f+3)-th frame based on the sound signals at the (f+2)-th frame or the (f+3)-th frame. The elevation angle estimation unit 106 (106B, 106C, 106D) may estimate the elevation angle using Expression (11) based on the estimated azimuth at the f-th frame or the (f+1)-th frame, the estimated azimuth at the (f+2)-th frame or the (f+3)-th frame, the posture information at the f-th frame or the (f+1)-th frame, and the posture information at the (f+2)-th frame or the (f+3)-th frame. In this case, it is preferable that the sound signal emitted from the sound source Sp be a sound signal in which sound does not vary but is continuous.

The first to fifth embodiments have described the example where the position of the sound source Sp in the world coordinate system does not vary; however, the present invention is not limited to this example. The position of the sound source Sp in the world coordinate system may vary. In this case, since the positions of the sound source Sp in the world coordinate system between the neighboring frames can be considered to be substantially the same as each other, the sound processing device 10 (10A, 10B, 10C, and 10D) can estimate the elevation angle using Expression (11).

The first and second embodiments have described the example where the values of the estimated azimuth and the estimated elevation angle are displayed on the display unit 107 and the third to fifth embodiments have described the example where the directions of the sound sources are visually displayed on the display unit 107 using the arrow 404, the spherical image 402, the ring-shaped image 403, and the images 451 of the numbers allocated to the sound sources; however, the present invention is not limited to these examples. The shapes of the images used for the description are only exemplary and different shapes may be employed. In the third to fifth embodiments, the values of the estimated azimuth and the estimated elevation angle may be displayed on the display unit 107.

Examples of equipment having the sound processing device 10 (10A, 10B, 10C, and 10D) include a robot, a vehicle, a portable terminal, and an IC recorder. In this case, the robot, the vehicle, the portable terminal, and the IC recorder may include a sound collection unit 20, a sensor 30, an imaging unit 40, and an operation unit 50.

The sound source direction may be estimated by recording a program for performing the functions of the sound processing device 10 (10A, 10B, 10C, and 10D) according to the present invention on a computer-readable recording medium and reading and executing the program recorded on the recording medium into a computer system. Here, the "computer system" may include an OS or hardware such as peripherals. The "computer system" may include a WWW system including a homepage providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that temporarily holds a program for a predetermined time, like a volatile memory (RAM) a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize a part of the above-mentioned functions or may be configured to realize the above-mentioned functions by combination with a program recorded in advance in a computer system, like a so-called differential file (differential program).

While various embodiments of the invention have been described in detail with reference to the drawings, the specific configurations are not limited to the above-men-

What is claimed is:

1. A sound processing device comprising:
a sound collection unit comprising a plurality of microphones configured to record sound signals;
a tilt information acquisition unit configured to acquire tilt information on a tilt of the sound processing device;
an azimuth estimation unit configured to estimate azimuths of a sound source in a plane in which the microphones are arranged based on the sound signals which are recorded by the microphones at least at two times; and
an elevation angle estimation unit configured to estimate an elevation angle of the sound source with respect to the plane in which the microphones are arranged based on the tilt information acquired by the tilt information acquisition unit and the azimuths estimated by the azimuth estimation unit at least at two times,
wherein the azimuths of the sound source are directions in the plane with respect to a direction from a central point of positions of the microphones to a predetermined microphone out of the plurality of microphones, and
wherein the microphones are arranged such that the central point of the positions of the microphones is the same as a central point of the sound processing device;
a display unit configured to display at least one image;
an imaging unit configured to capture a first image; and
an image processing unit configured to generate a second image indicating the elevation angle estimated by the elevation angle estimation unit and to display the generated second image on the display unit,
wherein the image processing unit is configured to generate a third image indicating the azimuth estimated by the azimuth estimation unit and displays the generated third image on the display unit,
wherein the image processing unit is configured to synthesize at least the first image indicating the elevation angle with the second image captured by the imaging unit, and to display the synthesized image on the display unit,
wherein the at least one image includes a spherical image a ring-shaped image which is displayed around an outline of a cross-section passing through a center of the spherical image, a line image which is directed to a direction of the sound source from the center of the spherical image, and a circle image which is located on the line image,
wherein the spherical image is displayed to be stabilized so that the ring-shaped image is normally displayed on a horizontal plane, and
wherein the circle image is displayed so that a location on the line image, a shape, and a color of the circle image are changed based on the elevation angle estimated by the elevation angle estimation unit.

2. The sound processing device according to claim 1, wherein the elevation angle estimation unit is configured to calculate a rotation matrix from a world coordinate system to a local coordinate system of the sound processing device based on the tilt information acquired by the tilt information acquisition unit, and to estimate the elevation angle of the sound source based on the calculated rotation matrix and the azimuths estimated by the azimuth estimation unit at least at two times.

3. The sound processing device according to claim 1, wherein the elevation angle estimation unit is configured to smooth the elevation angles estimated at a plurality of times and determines the smoothed value as the elevation angle of the sound source.

4. The sound processing device according to claim 1, wherein the image processing unit is configured to generate an image which varies at a speed based on the azimuth estimated by the azimuth estimation unit or the elevation angle estimated by the elevation angle estimation unit.

5. The sound processing device according to claim 1, further comprising:
a sound reproduction unit configured to reproduce a sound signal; and
an operation information acquisition unit configured to acquire selection information indicating a sound source selected by a user out of sound signals by sound sources,
wherein the azimuth estimation unit is configured to separate the sound signals recorded by the sound collection unit into the sound signals by sound sources, to estimate the azimuths of the sound sources based on the separated sound signals by sound sources, and to reproduce the sound signal corresponding to the selection information acquired by the operation information acquisition unit out of the separated sound signals from the sound reproduction unit.

6. A sound processing method using a sound processing device including a sound collection unit comprising a plurality of microphones, comprising:
a sound collecting step of recording sound signals using the microphones;
a tilt information acquiring step of acquiring tilt information on a tilt of the sound processing device;
an azimuth estimating step of estimating an azimuth of a sound source in a plane in which the microphones are arranged based on the sound signals which are recorded in the sound collecting step at least at two times;
an elevation angle estimating step of estimating an elevation angle of the sound source with respect to the plane in which the microphones are arranged based on the tilt information acquired in the tilt information acquiring step and the azimuth estimated in the azimuths estimating step at least at two times, wherein the azimuths of the sound source are directions in the plane with respect to a direction from a central point of positions of the microphones to a predetermined microphone out of the plurality of microphones; and
arranging the microphones such that the central point of the positions of the microphones is the same as a central point of the sound processing device,
displaying at least one image on a display unit configured to display the at least one image;
generating a first image using the image processing unit configured to generate the first image indicating the elevation angle estimated by the elevation angle estimation unit and to display the generated first image on the display unit;
capturing a second image using an imaging unit;
generating a third image using the image processing unit configured to generate the third image indicating the azimuth estimated by the azimuth estimation unit and displays the generated third image on the display unit; and
synthesizing at least the first image indicating the elevation angle with the second image captured by the imaging unit using the image processing unit configured to synthesize, and to display the synthesized image on the display unit, wherein the at least one image displayed on the display unit includes a spherical image, a ring-shaped image which is displayed around an outline of a cross-section passing through a center of the spherical image, a line image which is directed to a direction of the sound source from the center of the spherical image, and a circle image which is located on the line image, wherein the spherical image is displayed to be stabilized so that the ring-shaped image is normally displayed on a horizontal plane, and wherein the circle image is displayed so that a location on the line image, a shape, and a color of the circle image are changed based on the elevation angle estimated by the elevation angle estimation unit.

7. A non-transitory computer-readable storage medium comprising a sound processing program causing a computer of a sound processing device including a sound collection unit comprising a plurality of microphones to perform:

a sound collecting step of recording sound signals using the microphones;

a tilt information acquiring step of acquiring tilt information on a tilt of the sound processing device;

an azimuth estimating step of estimating an azimuth of a sound source in a plane in which the microphones are arranged based on the sound signals which are recorded in the sound collecting step at least at two times;

an elevation angle estimating step of estimating an elevation angle of the sound source with respect to the plane in which the microphone are arranged based on the tilt information acquired in the tilt information acquiring step and the azimuth estimated in the azimuths estimating step at least at two times, wherein the azimuths of the sound source are directions in the plane with respect to a direction from a central point of positions of the microphone to a predetermined microphone out of the plurality of microphones, and wherein the microphones are arranged such that the central point of the positions of the microphones is the same as a central point of the sound processing device;

displaying at least one image on a display unit configured to display the at least one image;

generating a first image using the image processing unit configured to generate the first image indicating the elevation angle estimated by the elevation angle estimation unit and to display the generated first image on the display unit;

capturing a second image using an imaging unit;

generating a third image using the image processing unit configured to generate the third image indicating the azimuth estimated by the azimuth estimation unit and displays the generated third image on the display unit; and synthesizing at least the first image indicating the elevation angle with the second image captured by the imaging unit using the image processing unit configured to synthesize, and to display the synthesized image on the display unit, wherein the at least one image displayed on the display unit includes a spherical image, a ring-shaped image which is displayed around an outline of a cross-section passing through a center of the spherical image, a line image which is directed to a direction of the sound source from the center of the spherical image, and a circle image which is located on the line image, wherein the spherical image is displayed to be stabilized so that the ring-shaped image is normally displayed on a horizontal plane, and wherein the circle image is displayed so that a location on the line image, a shape, and a color of the circle image are changed based on the elevation angle estimated by the elevation angle estimation unit.

8. The sound processing device according to claim 1, wherein the microphones are disposed at corners on top and bottom surfaces of the sound processing device.

* * * * *